United States Patent

[11] 3,593,300

[72] Inventors Graham C. Driscoll, Jr.
Yorktown Heights;
Alvin P. Mullery, Chappaqua, both of, N.Y.
[21] Appl. No 682,459
[22] Filed Nov. 13, 1967
[45] Patented July 13, 1971
[73] Assignee International Business Machines Corporation
Armonk, N.Y.

[54] ARRANGEMENT FOR AUTOMATICALLY SELECTING UNITS FOR TASK EXECUTIONS IN DATA PROCESSING SYSTEMS
5 Claims, 50 Drawing Figs.

[52] U.S. Cl. .......... 340/172.5
[51] Int. Cl. .......... G06f 15/16, G06f 15/20
[50] Field of Search .......... 340/172.5; 235/157

[56] References Cited
UNITED STATES PATENTS

| | | | |
|---|---|---|---|
| 3,440,617 | 4/1969 | Lesti | 340/172.5 |
| 3,421,150 | 1/1969 | Quosig et al. | 340/172.5 |
| 3,253,262 | 5/1966 | Wilenitz et al. | 340/172.5 |
| 3,419,849 | 12/1968 | Anderson et al. | 340/172.5 |
| 3,426,332 | 2/1969 | Cenfetelli | 340/172.5 |
| 3,435,422 | 3/1969 | Gerhardt et al | 340/172.5 |

OTHER REFERENCES
PROGRAMMING AND COMPUTING (Fortran IV)— J. T. Golden 1965 Prentice Hall, Inc., Englewood Cliffs, N. J. Pages 9— 13 and 245— 249 (LIBRARY OF CONGRESS CATALOG No. 65-23423)

*Primary Examiner*—Paul J. Henon
*Assistant Examiner*—Harvey E. Springborn
*Attorneys*—Hanifin and Jancin and Isidore Match

ABSTRACT: An arrangement in a data processing system which comprises a multiplicity of active components, or entities, such as processors, I/O devices, channels, etc., that have overlapping but not necessarily identical capabilities wherein there is enabled an automatic selection of an active entity for the execution of a chosen task by the use of hardware. In this regard, each active entity has associated therewith a capability factor, or vector, wherein each discrete position of the vector is related to a particular capability of the component, each capability being assigned an individual power weight. It is stipulated that a requirement vector be given as part of the specification of each task, the requirement vector being the same length as the capability vector, registered positions in the requirement and capability vectors pertaining to the same capability. In order to enable the selection of one of a number of active entities capable of executing a given task, each active entity is provided with a power index contained in a power vector. All of the power vectors respectively have the same number of positions, the latter number being at least equal to the greatest number of capabilities possessed by any entity in the system. When a plurality of active entities are available at any given time to execute a task offered for execution, an automatic selection is made to provide, for the execution of the task, that available properly capable active entity which has the lowest power index, the power index being the sum of the weights of the capabilities of a given active entity as set forth in its power vector.

INVENTORS
GRAHAM C. DRISCOLL, JR.
ALVIN P. MULLERY
BY Isidore Match
ATTORNEY

| | | | | | | | | | |
|---|---|---|---|---|---|---|---|---|---|
| FIG. 9A | SEND AND COMPARE | 1 | TRUE/ COMPLEMT | SEIZURE CODE/INDEX/ HALF-INDEX/PRIORITY | | IF EQUAL: FOLLOW/ IGNORE/REPEAT/FOLLOW IF LAST, ELSE IGNORE | | IF UNEQUAL: FOLLOW/ IGNORE/REPEAT/FOLLOW IF LAST, ELSE IGNORE | |
| FIG. 9B | COMPARE | 0 | 1 | WITH DISJUNC /WITHOUT DISJUNC | CLASS/JOB/TASK/PRIORITY/INDEX/ HALF-INDEX/INTERLOCK PARAMETER | | | IF EQUAL: FOLLOW/ IGNORE | IF UNEQUAL: FOLLOW/ IGNORE |
| FIG. 9C | RECEIVE | 0 | 0 | 1 | DESTINATION | | NUMBER OF BYTES | | |
| FIG. 9D | SET CONTROL BITS | 0 | 0 | 0 | 1 | IDENTIFICATION OF BITS | | | |
| FIG. 9E | (AVAILABLE) | 0 | 0 | 0 | 0 | 1 | | | |
| FIG. 9F | (AVAILABLE) | 0 | 0 | 0 | 0 | 0 | 1 | | |
| FIG. 9G | INTERACT | 0 | 0 | 0 | 0 | 0 | 0 | 1 | |
| FIG. 9H | ATTENTION | 0 | 0 | 0 | 0 | 0 | 0 | 0 | 1 |
| FIG. 9I | SEIZE BUS | 0 | 0 | 0 | 0 | 0 | 0 | 0 | 0 |

FOR PROCESSOR UNIT i

FOR CHANNEL UNIT j

FOR PROCESSOR UNIT i

FOR CHANNEL UNIT j

ARRANGEMENT FOR AUTOMATICALLY SELECTING UNITS FOR TASK EXECUTIONS IN DATA PROCESSING SYSTEMS

CROSS-REFERENCES TO RELATED APPLICATIONS

Copending application of Hans P. Schlaeppi for "Control Mechanism for a Multi-Processor Computing System," Ser. No. 607,040, filed Jan. 3, 1967, issued as U.S. Pat No. 3,480,914, dated Nov. 25, 1969 and assigned to the present assignee.

Copending application of Graham C. Driscoll for "Communication Arrangement in Data Processing System," Ser. No. 653,535, filed July 14, 1967 issued as U.S. Pat. No. 3,445,822, dated May 20, 1969 and assigned to the present assignee.

BACKGROUND OF THE INVENTION

This invention relates to parallel data processing systems. More particularly, it relates to an improved arrangement for efficiently selecting units of such processing systems to perform tasks in accordance with their respective capabilities.

In data processing systems in which several discrete autonomous processing units are arranged so as to share a common work load, i.e., multiprocessing systems, for example, considerations of efficiency of operation of the latter systems entail the need for communication between discrete units and the capability of influencing the course of one another's operation. Such communication can, of course, be effected entirely through main storage. However, the latter type communication is inherently wasteful in that it requires continual interrogation of storage. Accordingly, it is quite evident that direct interaction between units in multiprocessing systems could result in greatly enhanced efficiency of operation.

Where parallel processing is implemented in a multiprocessing system, there is achieved a wider distribution of functions throughout the system and the amount of interrupts may be diminished thereby. However, even where parallel processing is not being effected, needs for interaction between units occur in a great many situations.

Typically, example of areas wherein interaction is desirable are the problem area, i.e., the satisfaction of logical dependencies within a job; the supervisory area, i.e., the allocation of resources; and the system area, i.e., the coordination of the physical operations of the autonomous units. Thus, in the problem area, a program may call for interaction typically for interlocks and forced branches, such interlocks reflecting logical dependencies between parts of a problem. An efficient mechanism for handling these interlocks is necessary in order to make it profitable to process in parallel, those components of the problem which are substantially independent. In the supervisory area, it may be necessary to shift to a task of a high-priority job or to interrupt where too much time has been spent on a given task. In the system area, for example, there may be required the monitoring of queues to prevent needless accessing, the isolation of malfunctioning units, and interlocks to prevent the simultaneous use of a queue by several units.

In the Patent Application of Hans P. Schlaeppi for "Control Mechanism for a Multi-Processor Computing System," Ser. No. 607,040, filed Jan. 3, 1967, issued as U.S. Pat. No. 3,480,914, dated Nov. 25, 1969 and assigned to the assignee of this application, there is disclosed a multiprocessor computing system which includes a plurality of individual processor units which share a common central memory system and wherein each processor is connected directly to an interaction controller that is controlled independently of the processor sequence control, the interaction controller being operative in response to commands from either an associated processor or from another interaction controller. Commands between interaction controllers are transmitted by a common bus which is provided for linking together all of the interaction controllers respectively associated with each processor. Means are included within each of the interaction controllers for operating in response to commands appearing on the common bus transmitted by other interaction controller units as well as in response to commands issued by the processor to which a given interaction controller is directly connected. However, commands issued by a processor other than that directly connected with the aforesaid given interaction controller may not directly influence the latter interaction controller.

In the embodiment disclosed in the above-referenced patent application, the common bus linking the interaction controllers functions analogously to that of a telephone line wherein only one person can talk at any one time. To this end, means are respectively provided within the interaction controllers for the passing of control of the bus between the several interaction controllers in a "round-robin" sequence and for the maintaining of control of the bus by a given interaction controller until the latter interaction controller no longer needs the bus. Additional means are provided whereby a given interaction controller may request the services of one or several of the other interaction controller and wherein the other interaction controllers may indicate whether they are currently able to accept the request for service.

The embodiment disclosed in the above set forth patent application is efficacious in that it permits the various processors of a multiprocessor system to communicate with each other through the direct interaction of their respective associated interaction controllers and thereby enables a significant reduction of direct memory accesses for such interaction through interaction wiring, conventional storage registers and the like. Consequently, such operations as queue lockout, queue access, stop working on task, find processor, highest or lowest priority, etc., are economically executed thereby. However, it presents the deficiency in that in order to send a message without interference, an interaction controller has to have command of the bus, such command being allocated by having it pass cyclically and by having each interaction controller, upon completion of any transmission it may have to make, pass command of the bus to its successor. This in turn results in inefficient operation in that all too frequently, an interaction controller wishing to transmit may have to wait while a multiplicity of other interaction controllers, none needing the bus, cyclically passed the command thereof around to it.

Thus, to improve the efficiency of operation of the arrangement disclosed in the above-referenced patent application, viz, Ser. No. 607,040, it is necessary that the bus not be under the command of any interaction controller, i.e., that it be in an available state when it is not needed by any interaction controller. Since such construction could possibly result in a situation in which a plurality of interaction controller might simultaneously attempt to seize control of the bus, there exists the concomitant requirement that a tie-breaking arrangement be provided and which gives a fixed chosen precedence to the interaction controllers.

In the Patent application of G. C. Driscoll for "Communication arrangement in Data Processing System," Ser No. 653,535, filed July 14, 1967, issued as U.S. Pat. No. 3,445,822, dated May 20, 1969 and assigned to the assignee of the present application, there is disclosed an arrangement wherein the active units of the system can intercommunicate on a common bus and wherein the bus is maintained in an available state for use by any of the units when it is not in current use. In this latter application, there is also disclosed a tie-breaking arrangement which enables the assigning of a fixed precedence to the units of the system relative to the availability of the bus.

Parallel and multiprocessing systems may comprise several classes of active units such as data processors, channels, etc. with nonoverlapping capabilities. In such systems, all of the central processor units therein are provided with identical sets of instructions. Thus, if two channels both serve a given input-output device, then each channel respectively serves precisely the same set of input-output devices. In such arrangement, the selection of a chosen unit to perform a given task is then relatively simple, i.e., after the appropriate class of units is determined, an arbitrary choice is made from the available members of such class.

By contrast, it is possible for a parallel or a multiprocessing system to contain units with overlapping but not identical capabilities. For example, the system may contain central processing units therein which are capable of executing floating point but not decimal arithmetic instruction, and other central processor units which can execute decimal but not floating point instruction. Similarly, two channels may both be capable of serving a given tape unit while one and only one of them serves a card punch and the other and only that other of them serves a printer. It is readily appreciated that in such system, i.e., one containing units with overlapping but not identical capabilities, the selection of a unit therefrom to perform a given task presents a problem. In this connection, it is realized that a system comprising only a single central processor unit may be confronted with a similar problem in the selection, for example, of a channel for an input-output operation. In the case of the system comprising only a single central processor unit, however, the selection is made by the processor and the problem is solved by programming. In a parallel processing system, it is desirable to solve the problem presented by the presence of units of overlapping capabilities with a simple, automatic, hardware solution. Two cogent reasons for seeking such hardware solution are: the administrative overhead resulting from the introduction of parallelism into the system makes it desirable to minimize other overhead, and hardware employed in expediting the unit selection can also be used in meeting other requirements germane to parallel processing.

Accordingly, it is an important object of this invention to provide in a processing system which contains active components, or entities, having overlapping but not identical capabilities, an arrangement for efficaciously selecting an entity to perform a given task.

It is another object to provide an arrangement in accordance with the preceding object which is of simple construction and automatic in operation.

SUMMARY OF THE INVENTION

Generally speaking, and in accordance with the invention, there is provided an arrangement for automatically selecting for the execution of a task, an active component, or entity, in a data processing system comprising a plurality of active entities having overlapping capabilities. The arrangement comprises means for providing each of the active entities in the system with a capability factor, or vector, having a chosen number of positions for indicating therein the discrete capabilities of the entity and means for providing each task offered to the system with a requirement factor, or vector, having the last-named chosen number of positions, registered positions in the capability and requirement vectors representing the same respective capabilities and requirements. In order to enable the selection of a given active entity for the execution of a particular task, there are further included means for providing a power factor, or vector, to each active entity, each of the power vectors having a number of positions at least equal to the maximum amount of discrete capabilities of any of the entities, the respective sums of the weights of the discrete capabilities of each of the entities as set forth in their power vectors being their power indices. Means are further included responsive to the presence of a plurality of available entities having the capabilities required for an offered task for selecting for execution of such task that one of the last-named entities which has the lowest power index.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIGS. 9A—9I are respective depictions of directive sets explanatory of the operation of the invention;

DESCRIPTION OF A PREFERRED EMBODIMENT

Figure 1:
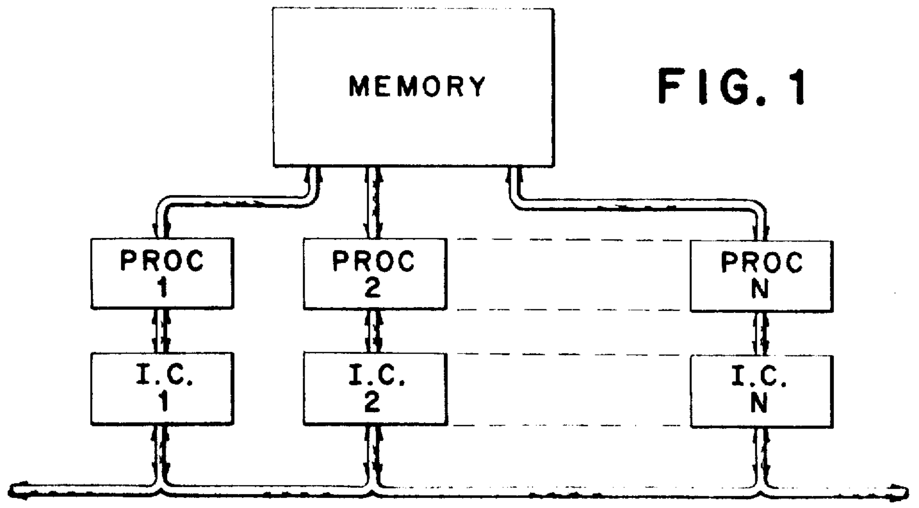
FIG. 1 is a block diagram of a multiprocessing system comprising a plurality of processors communicating with a common memory, each of the processors having respectively associated therewith an interaction controller, all of the interaction controllers being interconnected by a common bus.

As shown in FIG. 1 of the above-referred to patent application, Ser No. 607,040, and in FIG. 1 of the drawings, the overall arrangement of a multiprocessing system comprising a plurality of processors includes an interaction control unit, suitably referred to as an interaction controller, associated with each processor respectively. Each processor 1–N is connected directly to its associated interaction controller (I.C) and all of the interaction controllers are connected directly to a common interaction bus.

Each of these interaction controllers contains means responsive to commands from its associated processor to execute instruction sequences specified by the latter processor and also contains means to execute instruction sequences specified by other interaction controllers.

As will be shown hereinbelow, according to the invention, rather than having control passed to the same successor interaction controller in a round-robin sequential cycle independent of need for the bus, the control of the bus is passed to an interaction controller that is waiting for the bus. If more than one interaction controller is so waiting, then a determination is made according to the index numbers of the waiting interaction controllers. The latter determination may be generally described as being made in the following manner. The waiting interaction controllers are divided into two classes, a first class comprising those interaction controllers with index numbers that are less than that of the releasing interaction controller and a second class comprising those interaction controllers whole index numbers are greater than that of the releasing interaction controller. If there exist waiting interaction controllers in the first class, then the interaction controller in this first class with the highest index number is selected and is given control of the bus. If there are no waiting interaction controllers in the first class, then the second class of interaction controllers is examined and the controller with the highest index number in the second class is selected and is given control of the bus. If there are no waiting interaction controllers in either class, then the bus is in the "available" state.

The index number of each interaction controller consists of two digits, conveniently octal digits, and for convenience of description, designated $I_1$ and $I_2$ respectively. If it is assumed that $I_1$ designates the higher order digit and that $I_2$ designates the lower order digit, then the index numbers can thus vary from 00 (base 8) to 77 (base 8). The octal digits 0 thru 7 are encoded according to the table set forth immediately hereinbelow:

| Octal Digit | Encoded Representation |
|---|---|
| 0 | 10000000 |
| 1 | 11000000 |
| 2 | 11100000 |
| 3 | 11110000 |
| 4 | 11111000 |
| 5 | 11111100 |
| 6 | 11111110 |
| 7 | 11111111 |

The foregoing code presents a relatively simple and facile mechanism for determining maxima and minima, employing only a "compare" unit.

As has been stated hereinabove and also in accordance with the invention, there is also provided an arrangement whereby an interaction controller can seize control of the bus if the bus is in the available state and if two or more interaction controllers simultaneously attempt to seize the bus, the conflict is resolved in favor of the interaction controller having the highest index number.

In the above connection, each interaction controller is provided with its own fixed, unique seizure code which is a unique 8-bit binary number containing exactly four 0's and four 1's. It is appreciated that within such 8-bit binary number, there is possible a great number of presentations of four 0's and four 1's whereby many interaction controllers may have repetitive signal codes different from each other. In the same cycle in which it sends its seizure code, an interaction controller reads the bus and compares the signal code received therefrom with its own seizure code. If the latter signals are equal, such situation indicates that no other interaction controller has attempted to seize the bus and that the controller attempting to seize the bus has, in fact, obtained command of the bus. However, if the latter signals are not equal indicating that another interaction controller with its different signal code is also attempting to take command of the bus, then a tie exists which has to be broken.

To break a tie when it occurs, the interaction controllers involved in the tie employ their indices. An index suitably consists of two bytes, each of which consists of an initial string of 1's (at least one) followed by all 0's (possibly none). These indices are also suitably chosen to be octal digits and the tie is broken in favor of the contesting interaction controller with the highest index number. In the cycle after the tie is detected, each interaction controller involved sends the first byte of its index and compares the bus signal with this byte. If the interaction controller finds inequality, then a byte with more initial 1's has been sent, i.e., one of the other tied interaction controllers has a larger index number. Therefore, if the interaction controller does find inequality, it sends no further signals until it is so bidden, notes that the bus is unavailable, and awaits a later opportunity to seize the bus. If it finds equality, then on the next cycle, it sends its second index byte and compares the bus signal with this byte. Here again if it finds inequality, it yields the bus but if it finds equality, it has gained control of the bus. With this arrangement, ties can be broken employing an equality detector, i.e., the aforementioned compare unit.

In accordance with the invention, there is also provided an arrangement which also enables a "COUNTOFF" operation. In the latter operation, an interaction controller having control of the bus can address all of the other interaction controllers to interrogate them as to which and how many of them are working of the same job as the interaction controller commanding the bus. The arrangement operates in this situation such that all of the interaction controllers working on a given job first respond but only that interaction controller with the highest index number is counted. In a second response from the interaction controllers, the one found to have the highest index number in the first response is omitted. Thus, for example, if there were three interaction controllers, other than the interaction controller having command of the bus, working on the same job, all three would respond in a first response. A second response would include the two interaction controllers with the lowest index numbers and a third response would include only the interaction controllers with the lowest index number. In a fourth response, there would be no interaction controllers responding.

In considering various details of operation of the structures comprising the inventive arrangement, each interaction controller is arranged to be capable of gating signals onto the interaction bus. In principle, the bus is simply a set of conductors; however, as a practical matter, equipment such as amplifiers may be provided to provide the proper electrical characteristics.

Figure 2:
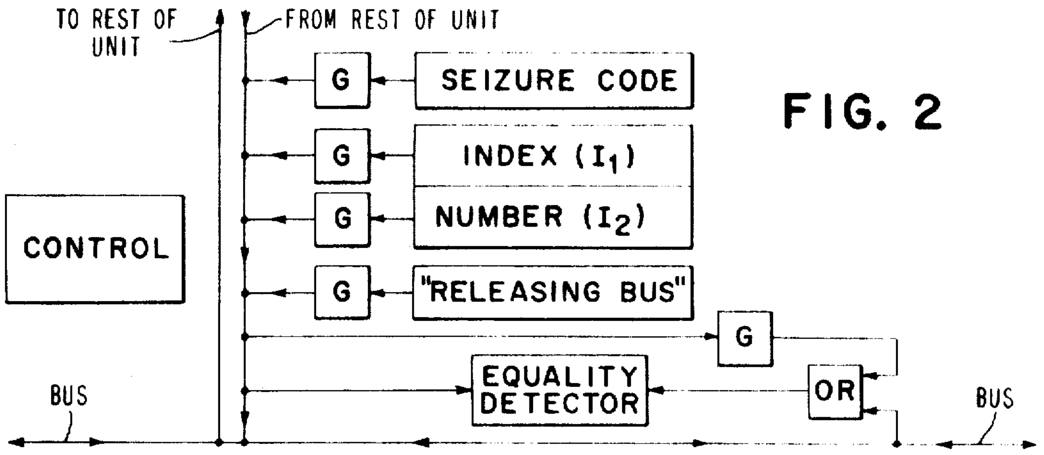
FIG. 2 is a block diagram of an illustrative embodiment of an interaction controller constructed in accordance with the principles of the invention.

Referring now to FIG. 2, there is shown therein a depiction of the structure required in an interaction controller according to the invention. It is noted therein that there is not required the capability of directly determining the larger of two encoded numbers but merely an equality detector. In considering the arrangement in FIG. 2, let it be assumed that the bus is one byte, the byte comprising eight bits in addition to any timing bytes and that there are more than eight but not more than 64 interaction controllers. Each interaction controller has two fixed quantities associated with it, viz, a unique seizure code which is 1 byte long and contains four "0"s and four "1"s and a unique index code consisting of 2 bytes, each of the latter having an initial string of 1's (at least one) followed by all zeros (perhaps none). As we have mentioned hereinabove, this index is considered as being a number expressed from two octal digits.

There is also a common one bit word which all units interpret as a "RELEASING BUS" signal.

Figure 3:
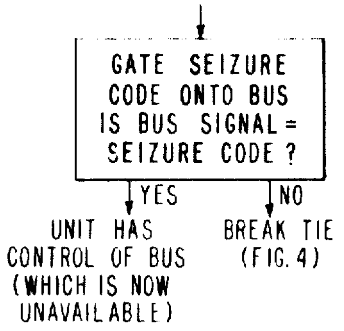
FIG. 3 is a conceptual depiction of the operation of an interaction controller in its attempt to seize command of the common bus.

At any given moment, either the bus is available or it is under the command of one interaction controller. In FIG. 3 there is shown how an interaction controller attempts to gain control of the bus. If there is a tie, a given interaction controller succeeds in gaining control only if it is the winner in the tie-breaking operation.

Figure 4:
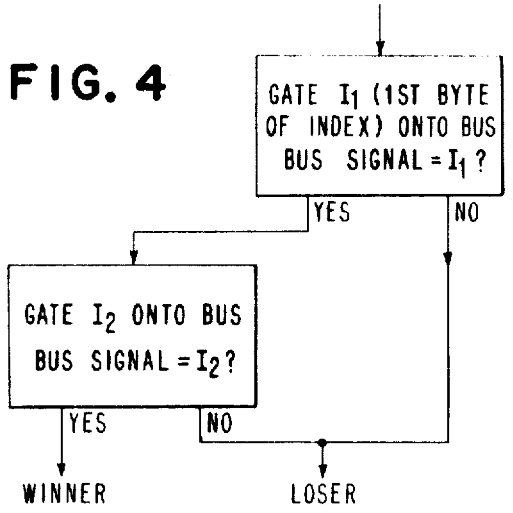
FIG. 4 is a conceptual depiction of the mechanism according to the invention as to how a tie is broken in awarding command of the bus to one of a plurality of contesting interaction controllers.

FIG. 4 is a conceptual depiction of the tie-breaking operation. Each box of FIG. 4 represents a bus signal. The empty box indicates that the interaction controller takes no action during that cycle. A tie is decided in favor of the interaction controller with the largest index.

Figure 5:
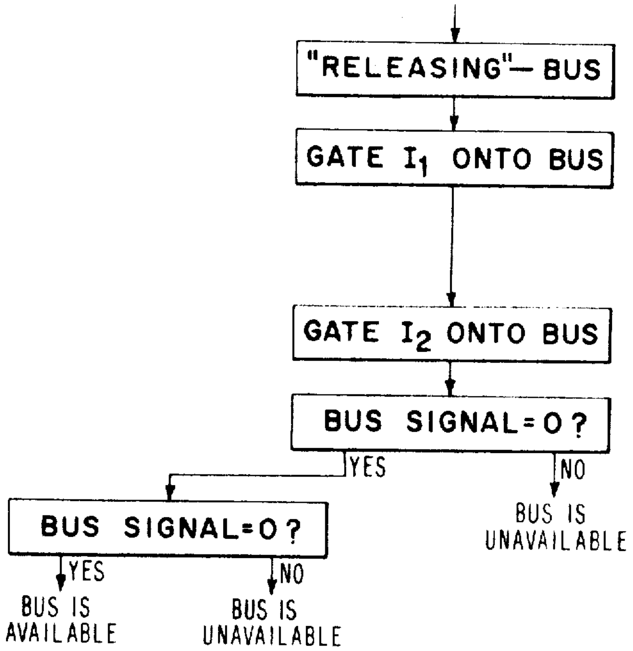
FIG. 5 is a flow diagram which indicates the sequence gone through when an interaction controller in command of the bus releases the bus when it no longer needs control thereof.

In FIG. 5 there is shown a flow chart which indicates how an interaction controller releases the bus when it no longer requires command thereof. In this connection, the releasing interaction controller sends its own index bits in order to allow other interaction controllers seeking control to arrange themselves into two classes, viz, those with lower indices and those with higher indices.

Figure 6:
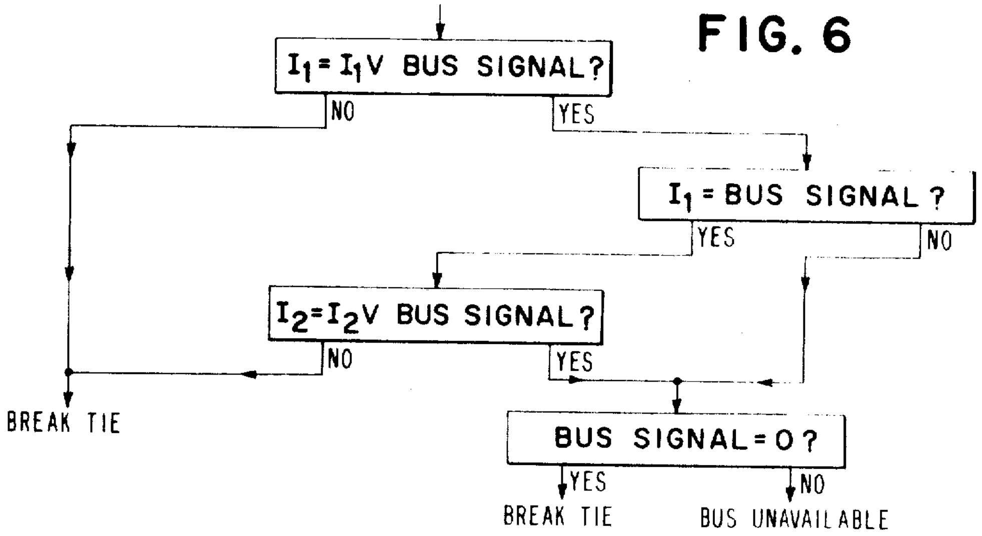
FIG. 6 is a flow diagram indicating the sequence undergone when an interaction controller wanting the bus which has been unavailable reacts when a bus releasing signal is transmitted.

The flow chart depicted in FIG. 6 illustrates how an interaction controller seeking control of the bus which has been theretofore unavailable reacts when the "RELEASING BUS" signal has just been sent. Thus, for example, let it be assumed that the releasing controller has a lower index (such lower index is not indicated in FIG. 6 but is assumed) than the releasing interaction controller, it proceeds immediately to break the tie (although in fact it may be the only such unit). With the foregoing assumption, if it has a higher index, it yields to those with the lower indices. If there are none, it proceeds to break the tie. Thus, control of the bus is passed to the requestor with the next lower index number, if any, and otherwise to the requestor with the highest index number.

It can readily be appreciated that it is relatively simple to use comparison circuitry to select those interaction controllers which are to receive the message. The interaction controller in command of the bus can specify what quantity each interaction controller is to compare with the bus signal on the next cycle and whether it is those finding equality or those finding inequality which are to receive the message. Thus, the sending interaction controller does not itself have to select interaction controllers to which its message is to go but instead a "to whom it may concern" type of communication is enabled.

Figure 7:
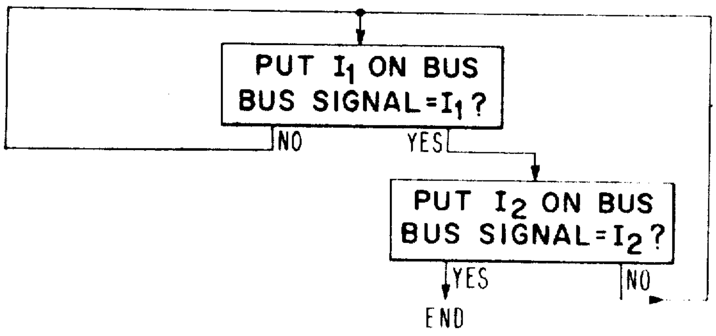
FIG. 7 is a flow diagram conceptually depicting the "countoff" operation, according to the invention.

FIG. 7 is a flow chart depicting the "COUNT OFF" operation.

Figure 8:
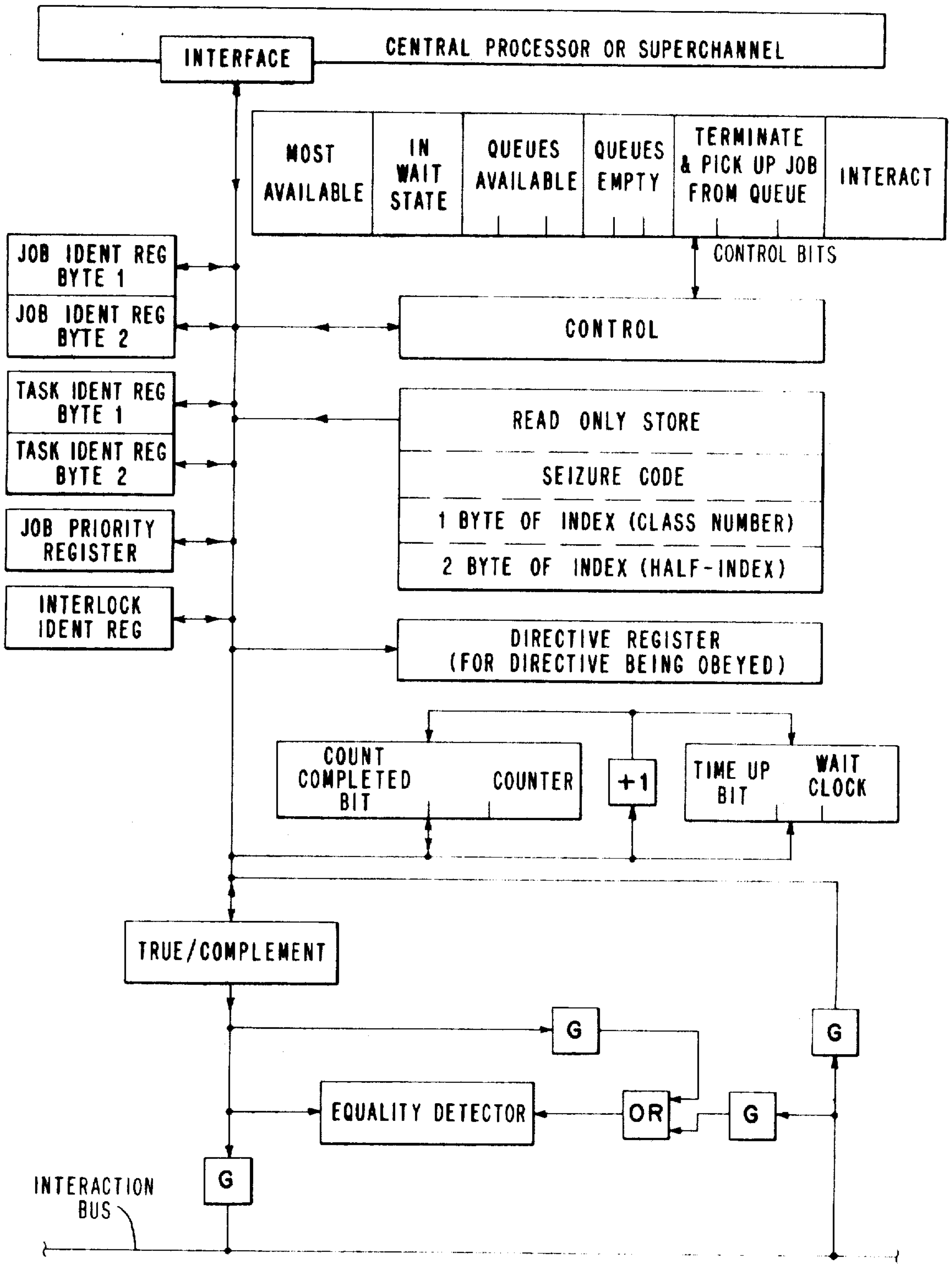
FIG. 8 is a diagram similar to that of FIG. 2 showing further structures included in the interaction controller and depicting the data paths therein.

FIG. 8 shows the data paths in an interaction controller in accordance with the invention. In FIG. 8, the "WAIT" clock is suitably employed to limit the time that a processor or channel spends in the "WAIT" state.

The control bits are employed to contain the information needed for the interaction operations and to transmit orders. If, for example, the interaction controller of a given central processor sets the "terminate and pick up from interruption queue" bits to 1, then the processor would finish its current instruction execution, dump its current task, pick up the first interruption task listed, and reset the last-named bit and the "-most available" bit to zero. The resetting of these bits would cause the interaction controller to execute the sequence to select a new most available unit.

FIGS. 9A through 9I show a directive set utilized in accordance with the invention. In this set, the term "follow" employed therein is meant to signify that an interaction controller is to obey the succeeding directive by "ignoring," i.e., that it is to ignore all directives until it reaches either an "ATTENTION" or a "SEIZE BUS" ("RELEASING BUS") directive. The term "half-index" is intended to designate the second byte of the index. The "ATTENTION" directive causes all interaction controllers to stop ignoring directives. It enables an interaction controller having command of the bus to select some interaction controllers and cause them to take some action, then after sending the "ATTENTION" directive to select some interaction other controllers and cause them to take some other action. If an interaction controller has been directed by a "SEND & COMPARE" directive to send a 2-byte quantity, i.e., its index, then it sends the second byte only if it found equality when sending the first byte. If it found inequality on the first byte, it skips the next cycle and then takes the action specified for inequality. The "follow if last, else ignore" option is implemented by the interaction controllers's comparing the bus signal with zero on the next cycle after finding equality for both bytes of its index successively. If the cycle is zero, the interaction controller was last and it follows the next directive. Otherwise, the interaction controller was not last and ignores succeeding directives. This option enables one to count the number of interaction controllers meeting chosen criteria and at the same time to select one of them.

If a "COMPARE" specifies "with disjunction," then the interaction controller compares the specified quantity, i.e., 1 or 2-byte quantity, with the "inclusive" OR of that quantity and the bus signal. Otherwise, the comparison is between the quantity and the bus signal.

The "INTERACT" causes a control bit to be set to "1" after the instruction has been received on succeeding bus cycles.

The second half of the "SET CONTROL BITS" directive specifies the bits and the value, for example.

Figures 10, 10A:
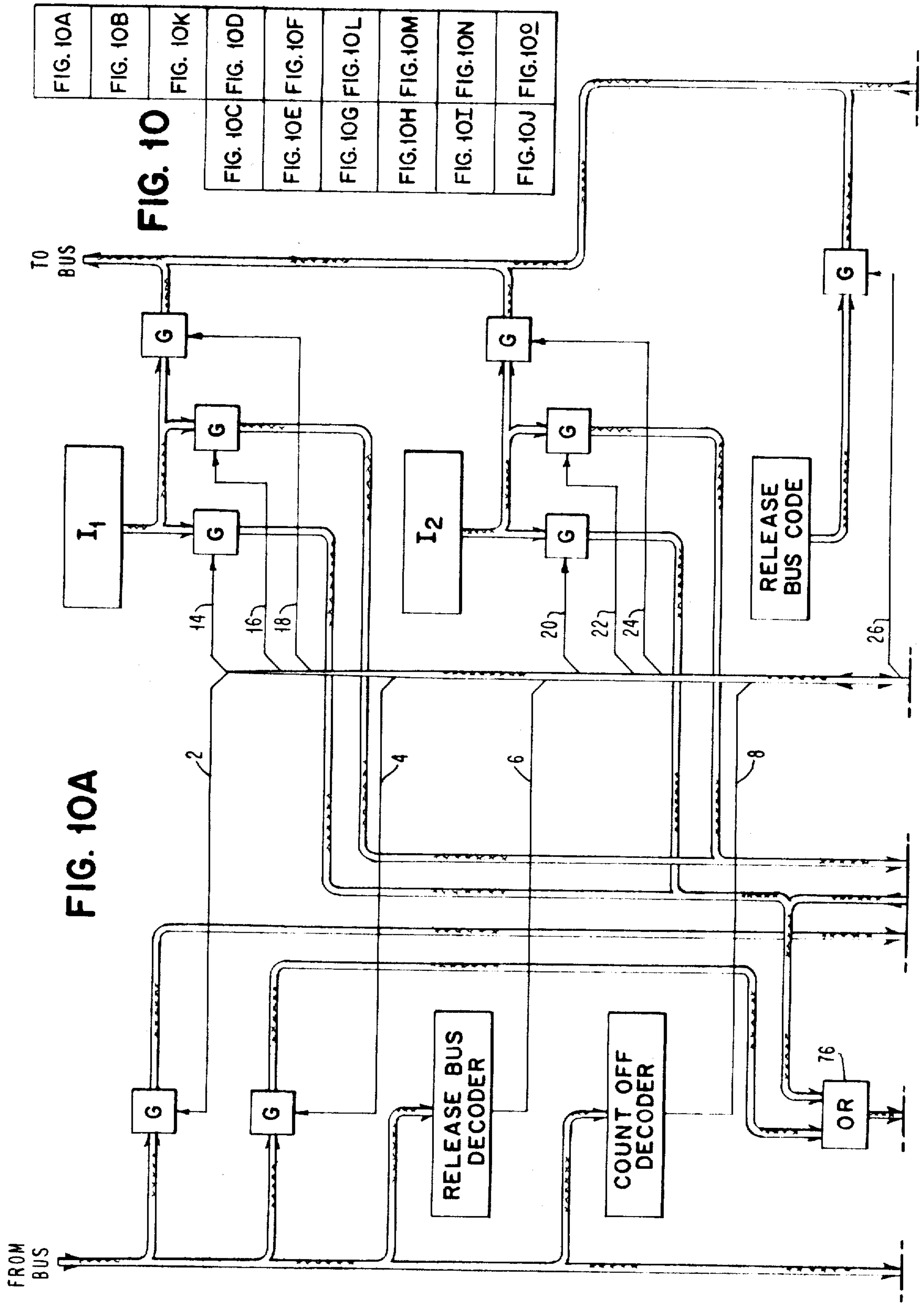
FIGS. 10A—10O, taken together as in FIG. 10, constitute a diagram of an illustrative embodiment of an arrangement for selecting units with overlapping capabilities in parallel data processing systems.
Figures 11, 11A, 11B, 11C, 11D:
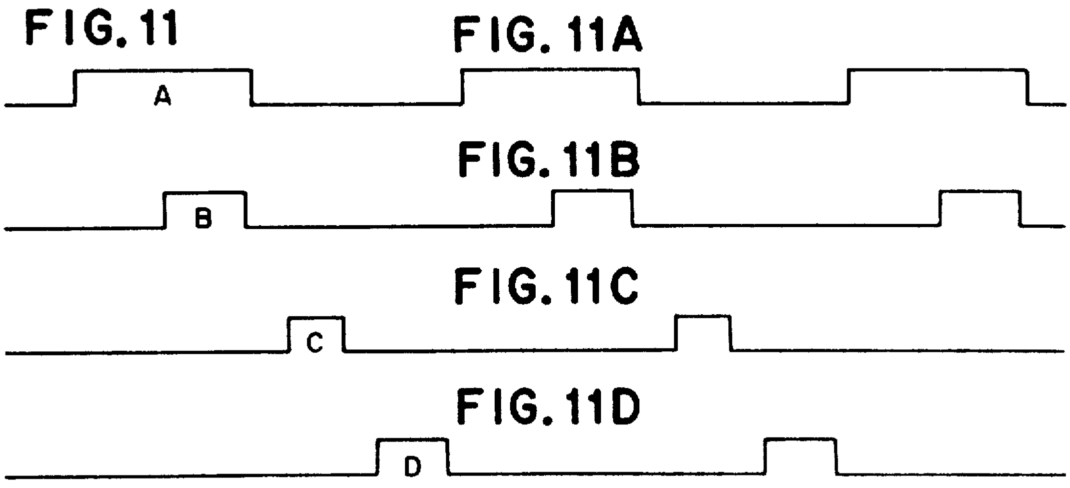
FIG. 11 is a timing diagram of synchronizing pulse train waveforms utilized in the invention, the waveforms being designated 11A—11D respectively.

This reference is now made to FIGS. 10A—10O, taken together as in FIG. 10, wherein there is depicted an illustrative embodiment of an interaction controller constructed in accordance with the principles of the invention. The embodiment shown in FIG. 10 is illustrated as synchronously operated and to this end the circuits contained therein are operated by the A, B, C, and D pulses shown in the pulse trains of FIGS. 11A—11D respectively, FIGS. 11A—11D collectively forming the timing diagram of FIG. 11. The pulse trains of FIG. 11 are applied to all interaction controllers. The A pulses are used to place information on the interaction bus. The B pulses are employed to read the bus after the bus has stabilized and the C and D pulses are utilized for control purposes.

Figures 13, 13A:
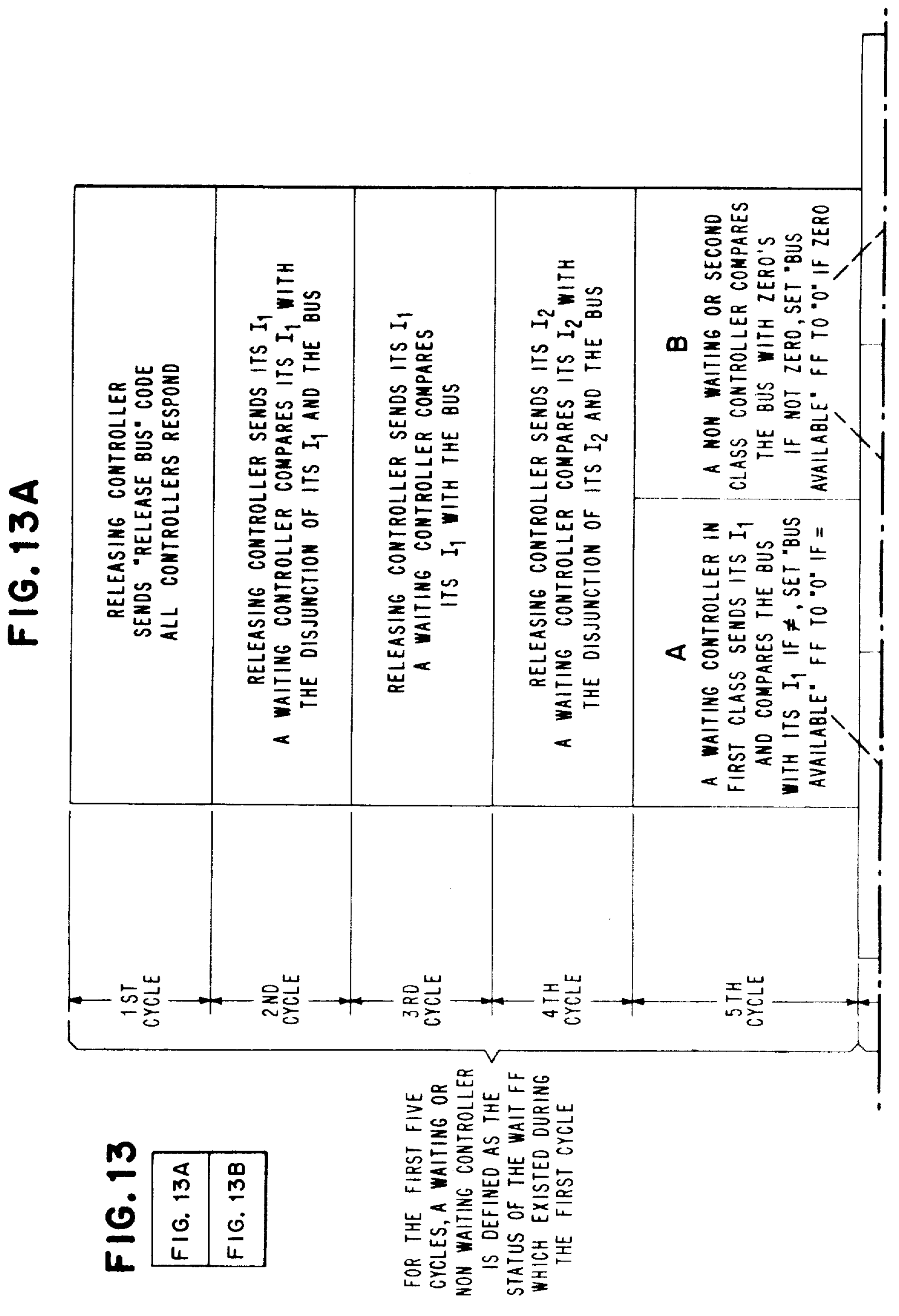
FIGS. 13A and 13B, taken together as in FIG. 13, comprise a flow diagram of the machine cycles gone through in the operation of the invention.
Figure 13B:
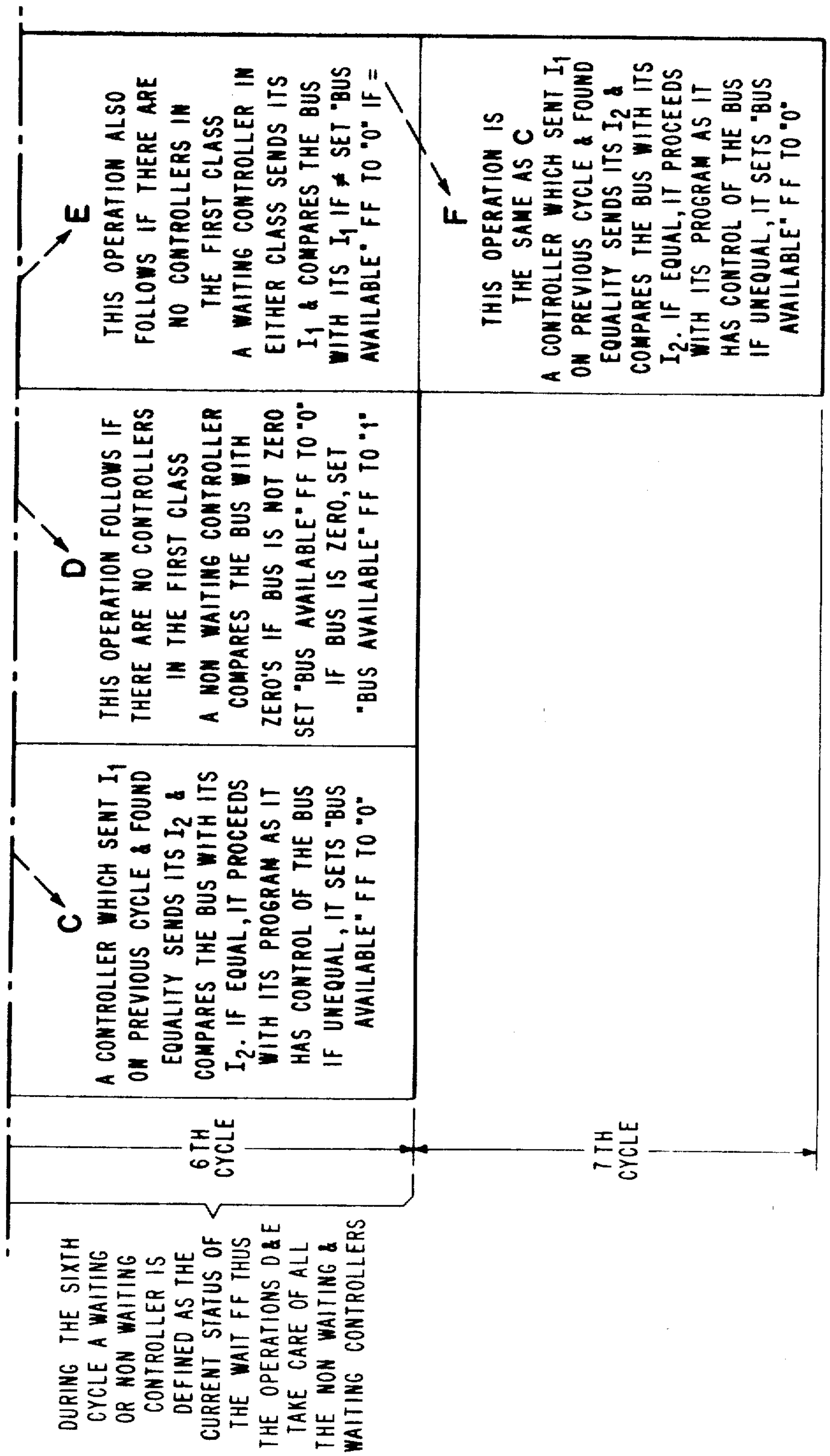

The first sequence of operation that is described is the "Release Bus" sequence, the latter sequence being shown in flowchart form on FIGS. 13A and 13B, which are taken together as shown in FIG. 13. It is noted that this sequence always employs at least six machine cycles and sometimes seven. Each interaction controller has to enter into this sequence although only the releasing and waiting interaction controllers perform operations during the first four cycles. In the fifth cycle, a nonwaiting interaction controller as well as a waiting interaction controller perform operations. Consequently, it is necessary for each nonwaiting interaction controller to keep track of the sequence in order to perform in the fifth and sixth machine cycles. In this latter connection, a releasing interaction controller is also considered a nonwaiting controller.

Figure 10B:
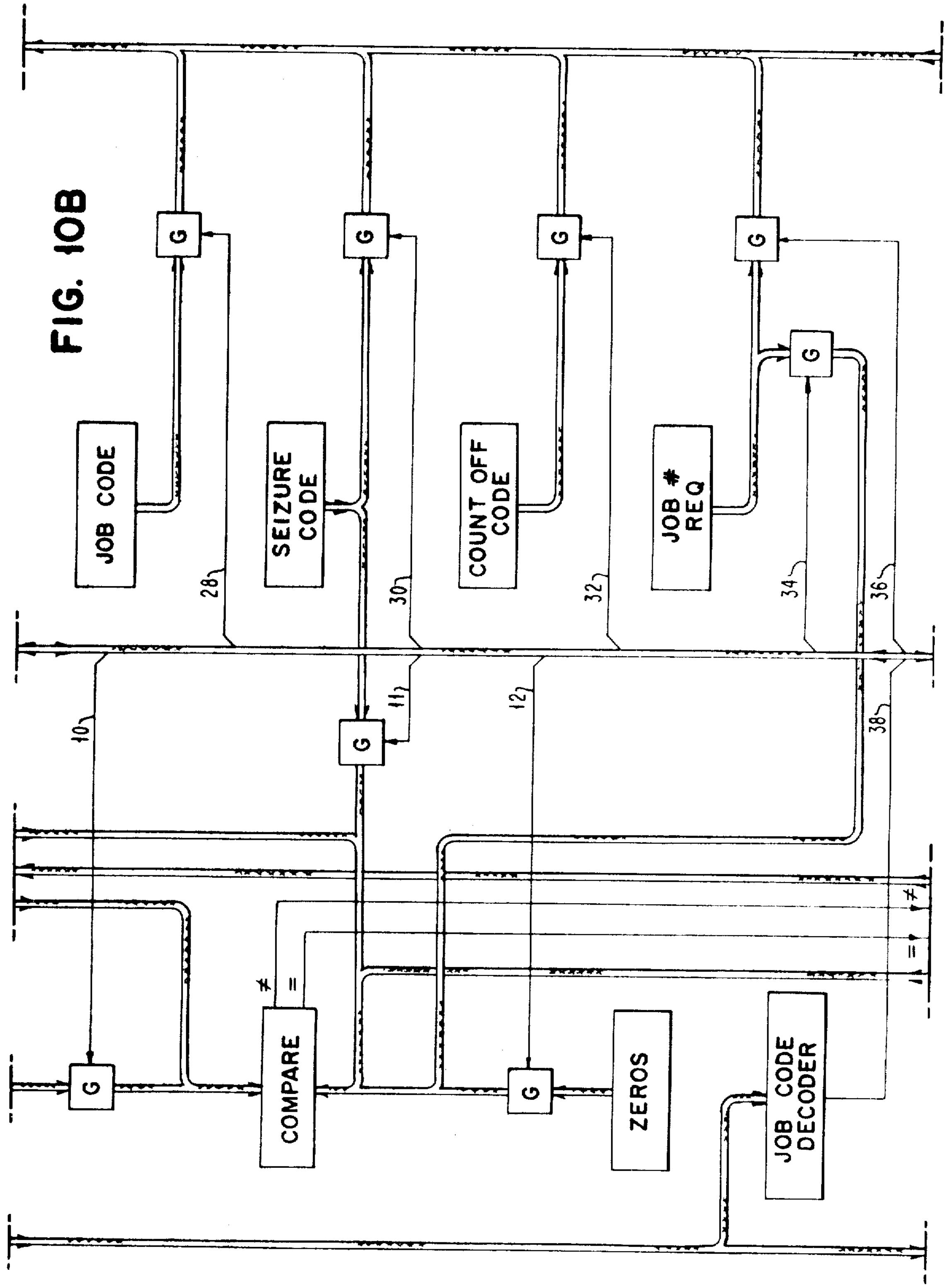
Figure 10C:
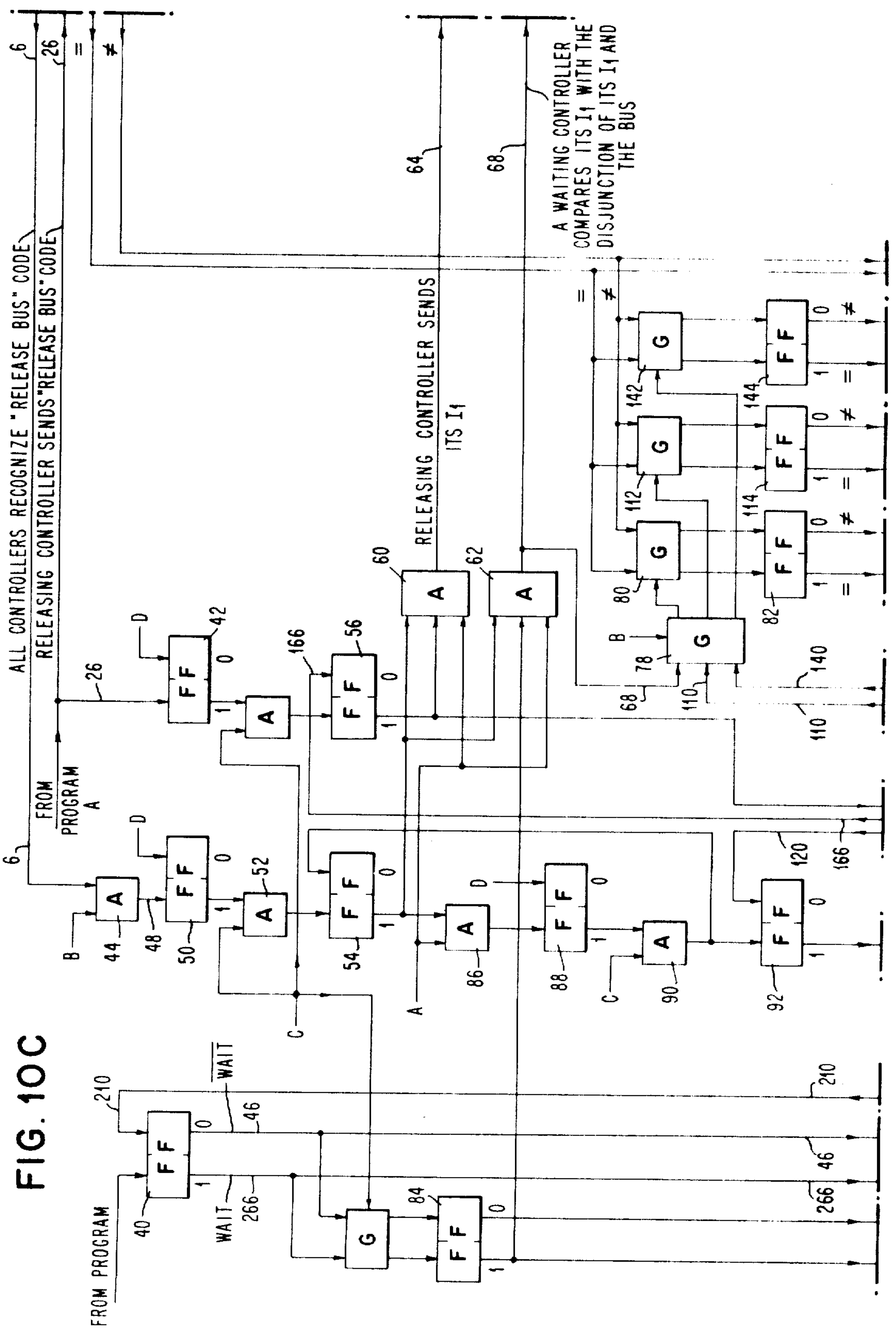

Referring to FIG. 10, the releasing interaction controller applies an A pulse to line 26 which is effective as shown in FIG. 10C to gate the "release bus" code to the bus. A flip-flop 42 (FIG. 10C) is set to "1." Flip-flop 42 is employed to control the sequence of machine cycles in the releasing interaction controller. Line 6 (FIGS. 10A, B and C) becomes active in all interaction controllers since all of the interaction controllers recognize the "release bus" directive which is on the bus. Line 6 connects to an AND circuit 44 which is enabled by a B pulse to set a flip-flop 50 (FIG. 10C) to the "1" state. Flip-flop 50 is set to the "1" state in all interaction controllers and, in the releasing interaction controller, flip-flop 42 is also set to the "1" state. The set output of flip-flop 50 is effective to enable an AND circuit 52 whereby a C pulse can set a flip-flop 54 to the "1" state, transfer the setting of a flip-flop 40 to a flip-flop 84 and, in the case of the releasing interaction controller, setting flip-flop 56 to the "1" state. A D pulse can now reset flip-flops 42 and 50 which signifies the end of the first machine cycle. The setting of flip-flop 54 insures the occurrence of the sequence of the next four machine cycles. In the releasing interaction controller, flip-flop 56 is set to the "1" state and, because the releasing interaction controller is also a nonwaiting interaction controller, flip-flop 84 is reset to the "0" state. In this connection, it is to be noted that in a waiting interaction controller, flip-flop 84, at this juncture, is set to the "1" state. At the end of the first machine cycle, the settings in flip-flops 84, 54 and 56 are as indicated in the table immediately set forth hereinbelow.

| Interaction controller | Flip-flop 84 | Flip-flop 54 | Flip-flop 56 |
|---|---|---|---|
| Releasing interaction controller | 0 | 1 | 1 |
| Non-waiting interaction controller | 0 | 1 | 0 |
| Waiting interaction controller | 1 | 1 | 0 |

Figure 10D:
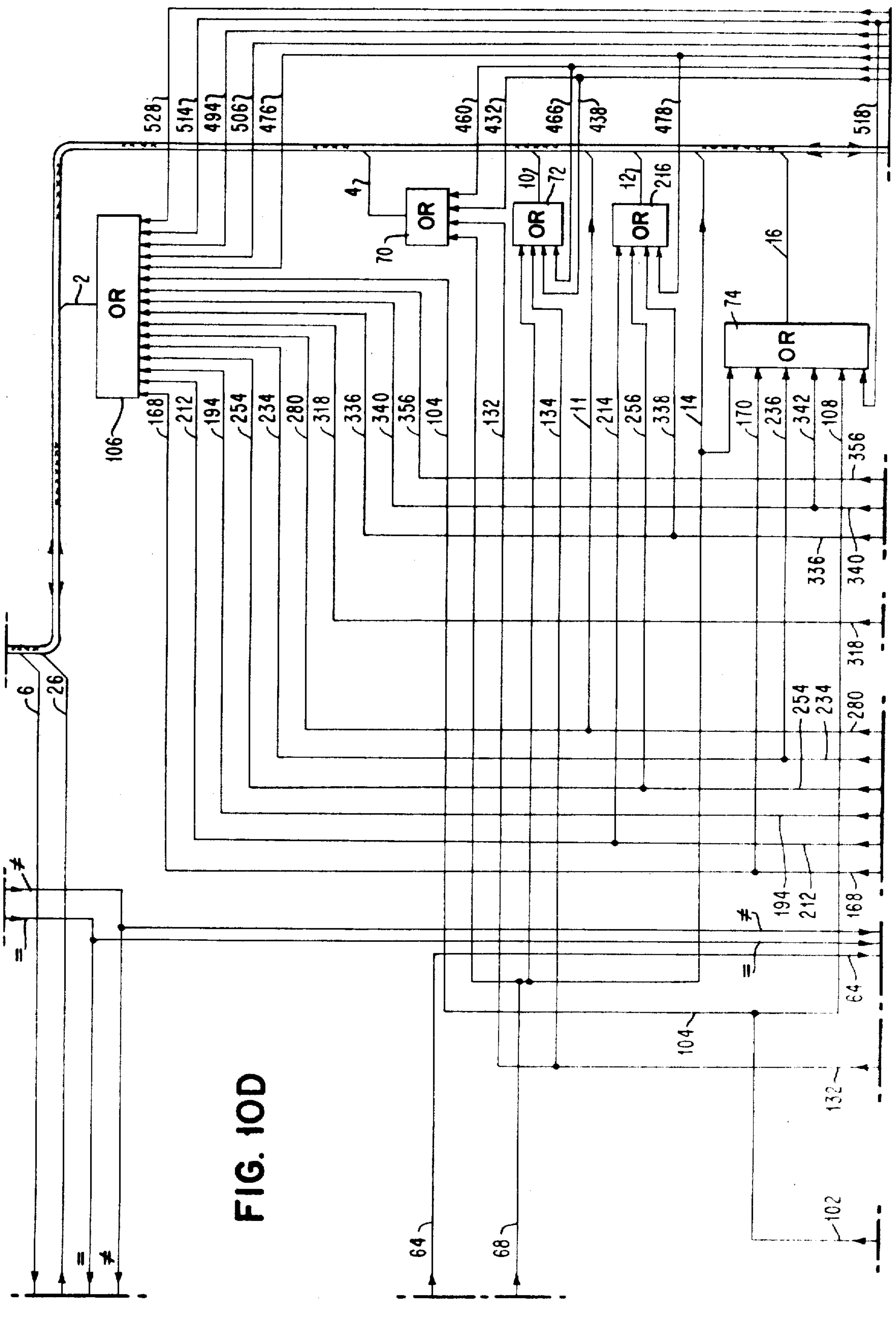

In the second machine cycle, during the A pulse time, and AND circuit 60 in the releasing interaction controller is enabled and an AND circuit 62 (FIG 10C) in a waiting interaction controller is enabled. Circuit 60 produces an output on line 64 which is applied to an OR circuit 66 (FIG 10F) The output of OR circuit 66 on a line 18 is effective to gate $I_1$ number of the releasing interaction controller to the bus. In a waiting interaction controller, AND circuit 62 produces an output on line 68 which is applied to an OR circuit 70 and an OR circuit 72, line 14, and OR circuit 74 (FIG. 10D). The output of OR circuit 70 appears on line 4 and is applied to gate the $I_1$ number of a waiting interaction controller to an OR circuit 76 (FIG. 10A). The output of OR circuit 72 appears on line 10 and is effective to gate the output of OR circuit 76 of a waiting interaction controller to the compare unit (FIG. 10B). The output appearing on line 14 is effective to gate the $I_1$ number of a waiting interaction controller to OR circuit 76. The output of OR circuit 74 which appears on line 16 is effective to gate the $I_1$ number of a waiting interaction controller to the compare unit. At B pulse time in the second machine cycle, a gate 78 is enabled which permits the pulse on line 68 to enable a gate 80 (FIG. 10C). A flip-flop 82 is set to the "1" state if the output of the compare unit is equal and is reset to the "0" state if the output of the compare unit is unequal.

Figure 12:
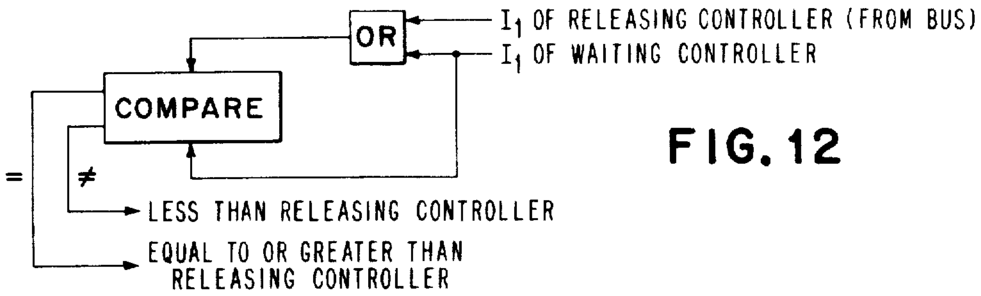
FIG. 12 is a logical diagram illustrating the operation of the "equality" or compare unit in the interaction controller, according to the invention.

The gating immediately described hereinabove is depicted in FIG. 12.

A waiting interaction controller in which the compare unit has an unequal output is definitely in the first class, or class of interaction controllers whose indices are less than that of the releasing interaction controller, and it does not have to participate in the ensuing next two cycles. In the embodiment depicted in FIG. 10, the next two cycles are in fact gone through by such class waiting interaction controller but the results thereof are disregarded. An example of the manner in which a determination is made during the second, third and fourth cycles, is shown in FIG. 14.

Figure 14:
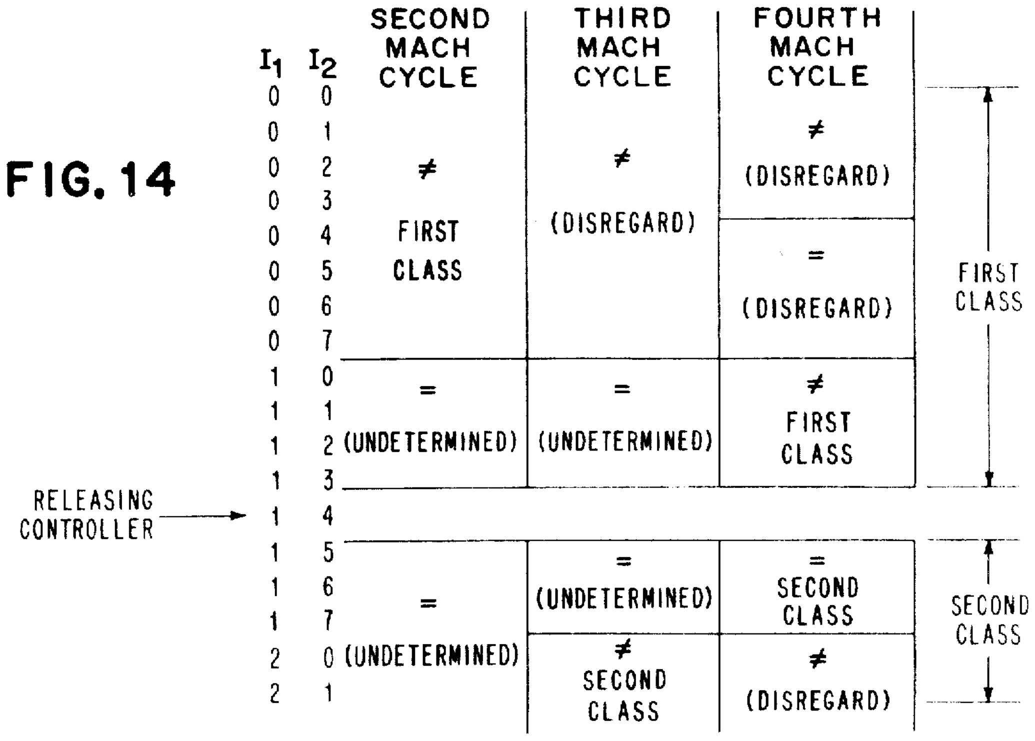
FIG. 14 is a chart depicting a portion of the machine cycle operation of interaction controllers.

The chart depicted in FIG. 14 sets forth waiting interaction controllers designated 00 (octal) to 21 (octal). In the examples shown in the chart, the releasing interaction controller is designated 14 (octal). It is to be noted that in the second machine cycle any waiting interaction controller having an index number $I_1$ equal to or greater than the index number $I_1$ of the releasing interaction controller results in its compare unit delivering an = (equal) output. The interaction controllers whose index numbers $I_1$ are less than that of the releasing interaction controllers will have an ≠ (unequal) output. Therefore, at the termination of the second machine cycle the interaction controllers designated 00—07 will be designated as being in the first class and those numbered 10—13 and 15—21 will be undetermined. In the third machine cycle, there is compared the index number $I_1$ of each waiting interaction controller with the index number $I_1$ of the releasing interaction controller. As shown in FIG. 14, interaction controllers having an octal number 20 and greater produce an ≠ (unequal) output and, accordingly, they definitely fall into a second class. Interaction controllers 10—13 and 15—17 are still undetermined. Interaction controllers 00—07 have an ≠ (unequal) output but this is disregarded by the system. In the fourth machine cycle, interaction controllers that were considered undetermined during the third cycle are separated into the two classes.

Referring back to FIG. 10, in the second machine cycle, the A pulse which had been applied to the AND circuits 60 and 62 (FIG. 10C) is also applied to an AND circuit 86. The "1" setting of flip-flop 54 is transferred to flip-flop 88. At C pulse time in the second machine cycle, an AND circuit 90 is enabled and the "1" setting of flip-flop 88 is transferred to a flip-flop 92. A D pulse in the second machine cycle is then effective to reset flip-flop 88 to the "0" state.

Figure 10E:
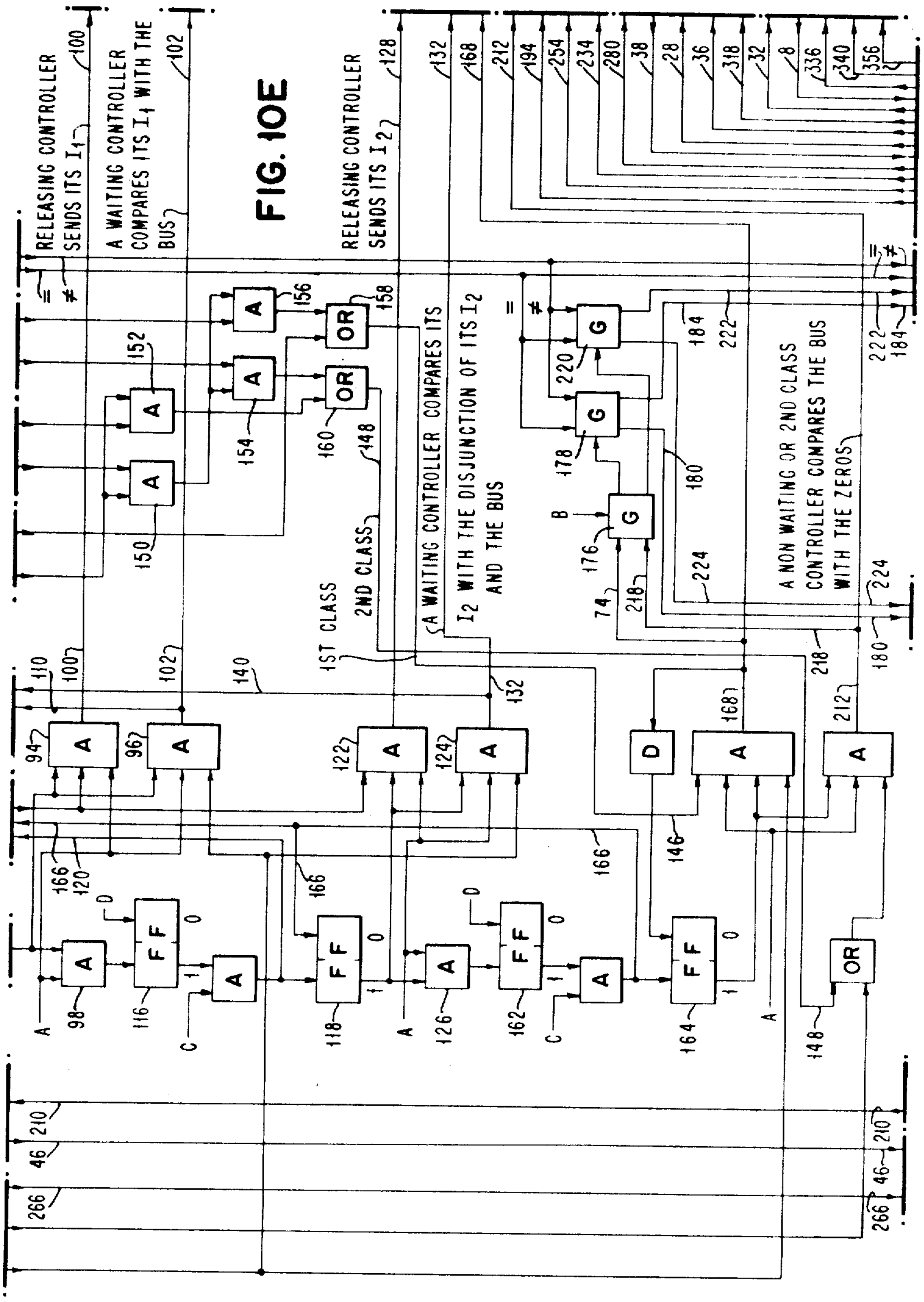

In the third machine cycle, an A pulse is applied as one input to AND circuits 94, 96 and 98 (FIG. 10E). In a releasing interaction controller, line 100 is activated whereby the output thereon is applied to an OR circuit 66 (FIG 10F) The output of OR circuit 66 appearing on line 18 is effective to gate the index number $I_1$ of the releasing interaction controller to the bus In a waiting interaction controller, line 102 (FIG. 10E) becomes active and branches to line 104 (FIG. 10D), the output on line 104 being applied to an OR circuit 106. The output of OR circuit 106 appears on line 2 and is effective to gate the bus setting to the compare unit (FIG. 10B). Line 102 also branches to line 108 (FIG. 10D), the output on line 108 being applied to OR circuit 74. The output of OR circuit 74 functions to gate the index number $I_1$ of a waiting interaction controller to the compare unit. The output appearing on line 102 is applied through a line 110 (FIG. 10C) to a gate 78 at B pulse time to enable a gate 112. With this arrangement, the output of the compare unit is thus permitted to set a flip-flop 114.

The A pulse applied to an AND circuit 98 transfers the setting of a flip-flop 92 (FIG. 10C) to a flip-flop 116 (FIG. 10E). A C pulse in the third machine cycle then transfers the setting of flip-flop 116 to a flip-flop 118 and the same C pulse is effective via lead 120 to reset flip-flop 92. The set output of flip-flop 118 is applied as an input to each of AND circuits 122, 124 and 126.

Figure 10F:
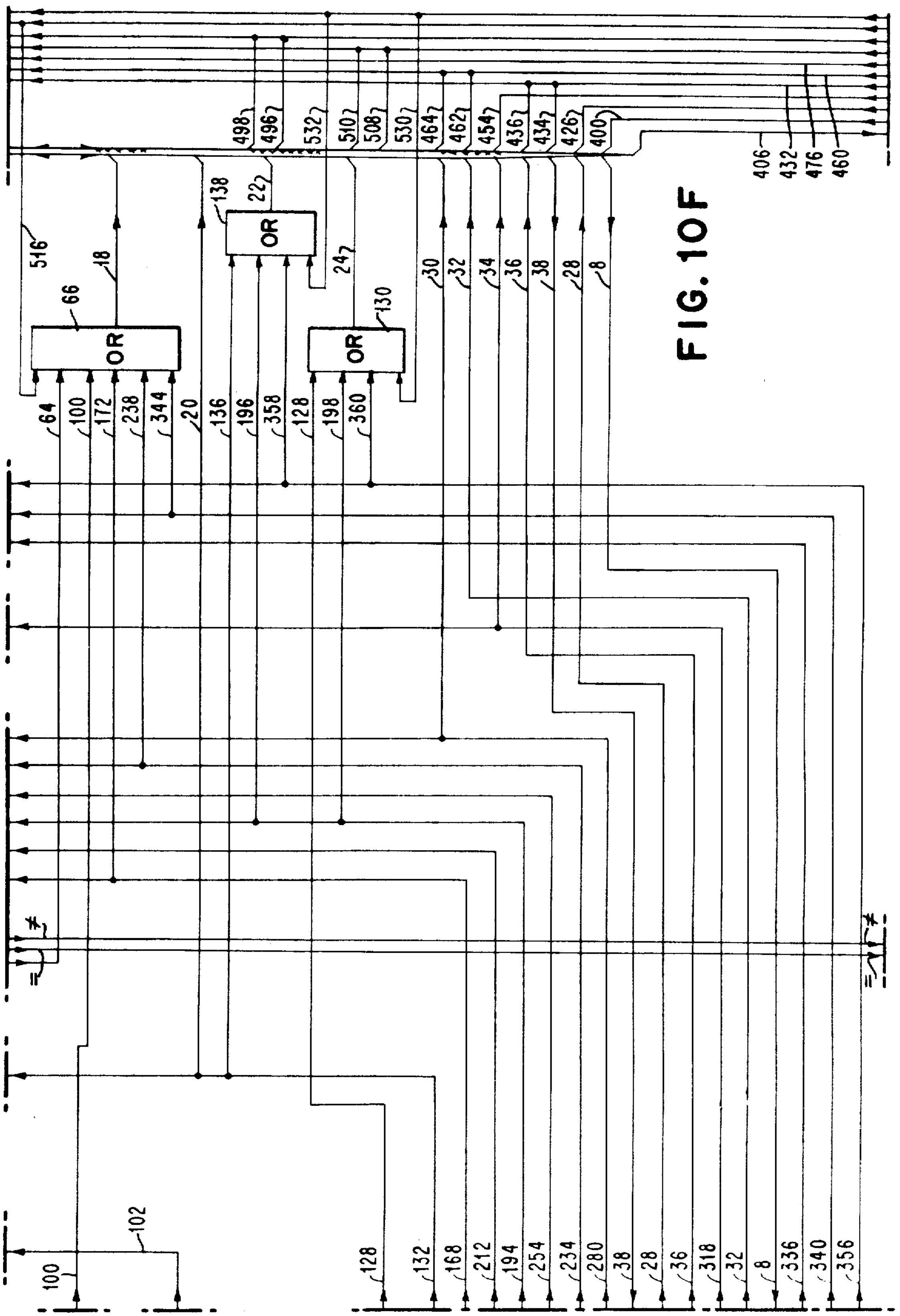

In the fourth machine cycle, an A pulse, applied to AND circuit 122 of a releasing interaction controller causes a line 128 to become active, the output on line 128 being applied to an OR circuit 130 (FIG. 10F). The output of OR circuit 130 appears on line 24 and is applied to gate the index number $I_2$ of a releasing interaction controller to the bus. In a waiting interaction controller, line 132 would become active in such situation. The output on line 132 is applied to OR circuit 70 (FIG. 10D) whose output appears on line 4 and is employed to gate the bus setting to an OR circuit 76 (FIG. 10A). Line 132 branches to lead 134, the output appearing on lead 134 being applied to OR circuit 72 (FIG. 10D). The output of OR circuit 72 appears on line 10 and is used to gate the output of OR circuit 76 (FIG. 10A) to the compare unit (FIG. 10B). Line 132 also branches to a lead 20 (FIG. 10A), the output appearing on lead 20 being applied to gate the index number $I_2$ of a waiting controller to OR circuit 76. Lead 132 also branches to a lead 136 (FIG. 10F), the output appearing on lead 136 being applied to an OR circuit 138, the output of OR circuit 138 appearing on line 22 and being employed to gate the index number $I_2$ of a waiting interaction controller to the compare unit. With the arrangement described immediately hereinabove, the index number $I_2$ of a waiting controller is compared with the disjunction of its index number $I_2$ and the bus setting.

As shown in FIG. 10C, lead 132 branches to lead 140. When lead 140 is in the active state, such state extends through gate 78 at B pulse time in the fourth machine cycle and enables a gate 142. The output of the compare unit is effective to set a flip-flop 144. The operation of separating the waiting interaction controllers into the two classes as exemplified by the chart in FIG. 14 and by the first four machine cycles as depicted in FIG. 13 is now completed. From an examination of FIG. 10D, it can be seen that, if line 146 is active, a waiting interaction controller is in the first class, and that if line 148 is active, that the waiting interaction controller is in the second class. The AND circuits 150, 152, 154, 156, and the OR circuits 158 and 160 effectively provide a steering circuit which accomplishes the proper separation into one of the two classes.

When the A pulse was applied to an AND circuit 126 (FIG. 10D) in the fourth cycle, it transferred the setting of a flip-flop 118 to a flip-flop 162. A C pulse in the fourth machine cycle then transfers the setting of flip-flop 162 to a flip-flop 164. This same C pulse is effective on lead 166 to reset flip-flop 118 and to reset flip-flop 56. Flip-flop 56 is reset at this time because the releasing interaction controller has completed its function.

As indicated in FIG. 13, two operations occur concurrently in the fifth cycle. Thus, at A pulse time, in a waiting interaction controller of the first class, line 168 (FIG. 10E) becomes active whereby the output appearing thereon is applied as one input to an OR circuit 106 (FIG. 10D) whose output appears on line 2. The output of OR circuit 106 is utilized to gate the bus setting to the compare unit. Line 168 branches to a lead 170, the output appearing on lead 170 being applied as an input to OR circuit 74 (FIG. 10D). The output of OR circuit 74 on line 16 is employed to gate the index number $I_1$ to the compare unit. Line 168 also branches to line 172, the output appearing on line 172 being effective through OR circuit 66 (FIG. 10F) and line 18, to gate index number $I_1$ to the bus.

As shown in FIG. 10E, line 168 branches to line 174 and, at B pulse time, the output on line 174 passes through a gate 176 and enables a gate 178. If the compare unit finds equality, a line 180 becomes active to set a flip-flop 182 (FIG. 10G) to the "1" state. If the compare unit does not find equality, a line 184 (FIG. 10G) becomes active to reset the "Bus Available" flip-flop (FIG. 10H) to the "0" state through an OR circuit 186. Thus, if the compare unit finds inequality, it is indicated that the index number of the interaction controller is not the highest one, of the first class. If the compare unit finds equality, then it is indicated that there remains a chance that the interaction controller may be the one with the highest index number of the first class and thereupon the interaction controller proceeds to the next cycle to have its index number $I_2$ checked with that of any other interaction controller that may also have found equality in the fifth cycle.

A waiting interaction controller in the first class that had found equality in the fifth cycle would proceed to operation C (FIG. 13B) in the sixth cycle. Such functioning is made possible by the setting of flip-flop 182 (FIG. 10G) to the "1" state as described hereinabove. At C pulse time in the fifth cycle, the setting of flip-flop 182 is transferred to flip-flop 188. This permits a line 190 to become active at A pulse time in the sixth cycle. The active condition of line 190 extends through an OR circuit 192 to line 194 which extends to an OR circuit 106 (FIG. 10D). The output of OR circuit 106 appears on line 2 (FIG. 10D) to gate the bus setting to the compare unit. Line 194 branches to line 196 (FIG. 10), the output on line 196 being effective through an OR circuit 138 and a lead 22 (FIG. 10F) to gate the index number $I_2$ to the compare unit. Another lead branching from line 194 is a line 198, the output on line 198 being effective through an OR circuit 130 (FIG. 10F) and a lead 24 to gate the index number $I_2$ to the bus.

Figure 10G:
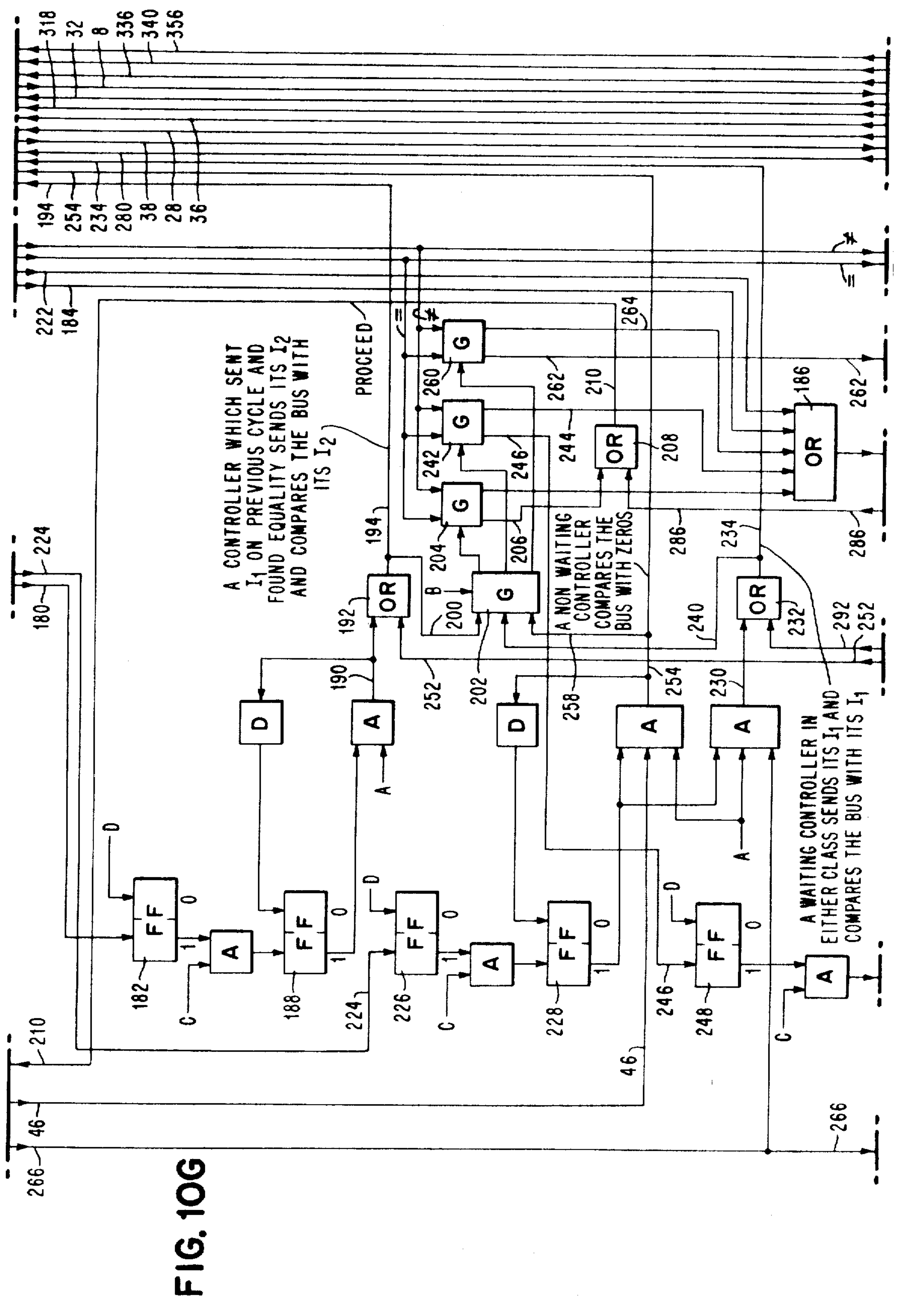

As seen in FIG. 10G, line 194 branches to a line 200, the output appearing on line 200 being effective at B pulse time to enable a gate 204 through a gate 202. At this juncture, the interaction controller that finds equality ascertains that is has won any existing tie because a line 206 becomes active. Line 206 extends to an OR circuit 208 to a line 210, the output appearing on line 210 being employed to reset "Wait" flip-flop 40 (FIG. 10C) back to the "0" state. Such resetting is a signal to the interaction controller to proceed with its program.

Referring back to the fifth cycle (FIG. 13A), it is noted therein that an operation B goes on concurrently with operation A as already described hereinabove. Operation B can succeed only if there are no leading controllers of the first class. In operation B, a line 212 becomes active (FIG. 10E). Line 212 extends to line 2 via OR circuit 106 and is used to gate the bus setting to the compare unit. Line 212 branches to a line 214 which extends via an OR circuit 216 (FIG. 10D) to line 12 and is employed to gate zeros to the compare unit. If there are no waiting interaction controllers of the first class, there will be all zeros on the bus and this condition is manifested by the compare unit's finding of equality. If there are waiting interaction controllers of the first class, the compare unit will find inequality.

To sample the compare unit, line 212 (FIG. 10E) branches to line 218, the active state of which extends through gate 176 (FIG. 10E) at B pulse time to enable a gate 220. If gate 220 is producing an output on line 222, the "Bus Available" flip-flop is reset to the "0" state. If gage 220 is producing an output on line 224, flip-flop 226 (FIG. 10G) is set to the "1" state. At C pulse time in the fifth cycle the setting of flip-flop 226 is transferred to flip-flop 228. With this arrangement, the operations D and E as shown in FIG. 13B are caused to occur in the sixth cycle.

In the sixth cycle, it is desired to take advantage of the possibility that some interaction controllers may have changed from a nonwaiting to a waiting status in the period that flip-flop 84 (FIG. 10C) was in the set state in the first cycle. It is to be noted that in the sixth cycle, control passes back to "Wait" flip-flop 40 instead of to flip-flop 84.

In operation E of the sixth cycle (FIG. 13B), line 230 (FIG. 10G) becomes active and its active condition extends through an OR circuit 232 to line 234 which extends through an OR circuit 106 (FIG. 10D) to line 2 which is employed to gate the bus setting to the compare unit. Line 234 branches to line 236 which extends through OR circuit 74 (FIG. 10D) to line 16, the output on line 16 being employed to gate the index number $I_1$ to the compare unit. Line 234 also branches to line 238 which extends through OR circuit 66 to line 18, the output on line 18 being employed to gate the index number $I_1$ to the bus.

The active condition of line 234 extends at B pulse time through a line 240 and gate 202 to enable a gate 242. If the compare unit finds inequality, an output appears on line 244 to reset the "Bus Available" flip-flop to the "0" state and the interaction controller is thus apprised that it has lost the contest. If, however, an output appears on line 246, the interaction controller is apprised that it must still compete with other possible waiting interaction controllers that have the same index number $I_1$. An output on line 246 sets a flip-flop 248 (FIG. 10G) to the "1" state. A C pulse time in the sixth cycle, the setting of flip-flop 248 is transferred to a flip-flop 250 which permits an operation F in the seventh cycle (FIG. 13B).

At A pulse time and in the seventh cycle, a line 252 (FIG. 10H) becomes active to activate line 194 through an OR circuit 192 (FIG. 10G). The events that thereupon ensure for an F operation (seventh cycle, FIG. 13B) are the same as those described for a C operation.

In the sixth cycle, an operation D (FIG. 13B) is performed concurrently with an operation E. This operation D can succeed only if there are no waiting interaction controllers in either class. At A pulse time in the sixth cycle, a line 254 (FIG. 10G) becomes active. Line 254 extends to line 2 through OR circuit 106 to gate the bus setting to the compare unit. Line 254 branches to line 256, the output on line 256 being effective through OR circuit 216 and line 12 to gate zeros to the compare unit. Line 254 also branches to line 258, the output on line 258 being effective at B pulse time through gate 202 to enable a gate 260 (FIG. 10G). A interaction controller whose compare unit finds equality produces an output on line 262 which sets the "Bus Available" flip-flop to the "1" state. This occurs if there are no waiting interaction controllers in either class. A compare unit that finds inequality, will have an output on line 264 which, through OR circuit 186, resets the "Bus Available" flip-flop to the "0" state.

The foregoing is the description of the "Release Bus" sequence.

"Seize Bus" Sequence

Any interaction controller whose "Bus Available" flip-flop is in the "1" state at the time that its "Wait" flip-flop (Flip-flop 40, FIG. 10C) is set to the "1" state can enter this sequence. The interaction controller will be successful in obtaining command of the bus if it is the only interaction controller attempting to seize the bus or if its index number is greater than that of any other controller that attempts to seize the bus at the same time. If it is the only interaction controller attempting to seize the bus, only one cycle is required. If it is not the only interaction controller attempting to seize the bus, then three cycles are required, the latter two of these three cycles being the same as cycles E and F as depicted in FIG. 13B. In the case of a tie, a losing interaction controller only goes through cycle E. A interaction controller that has a chance of winning the tie proceeds to cycle F.

Figure 10H:
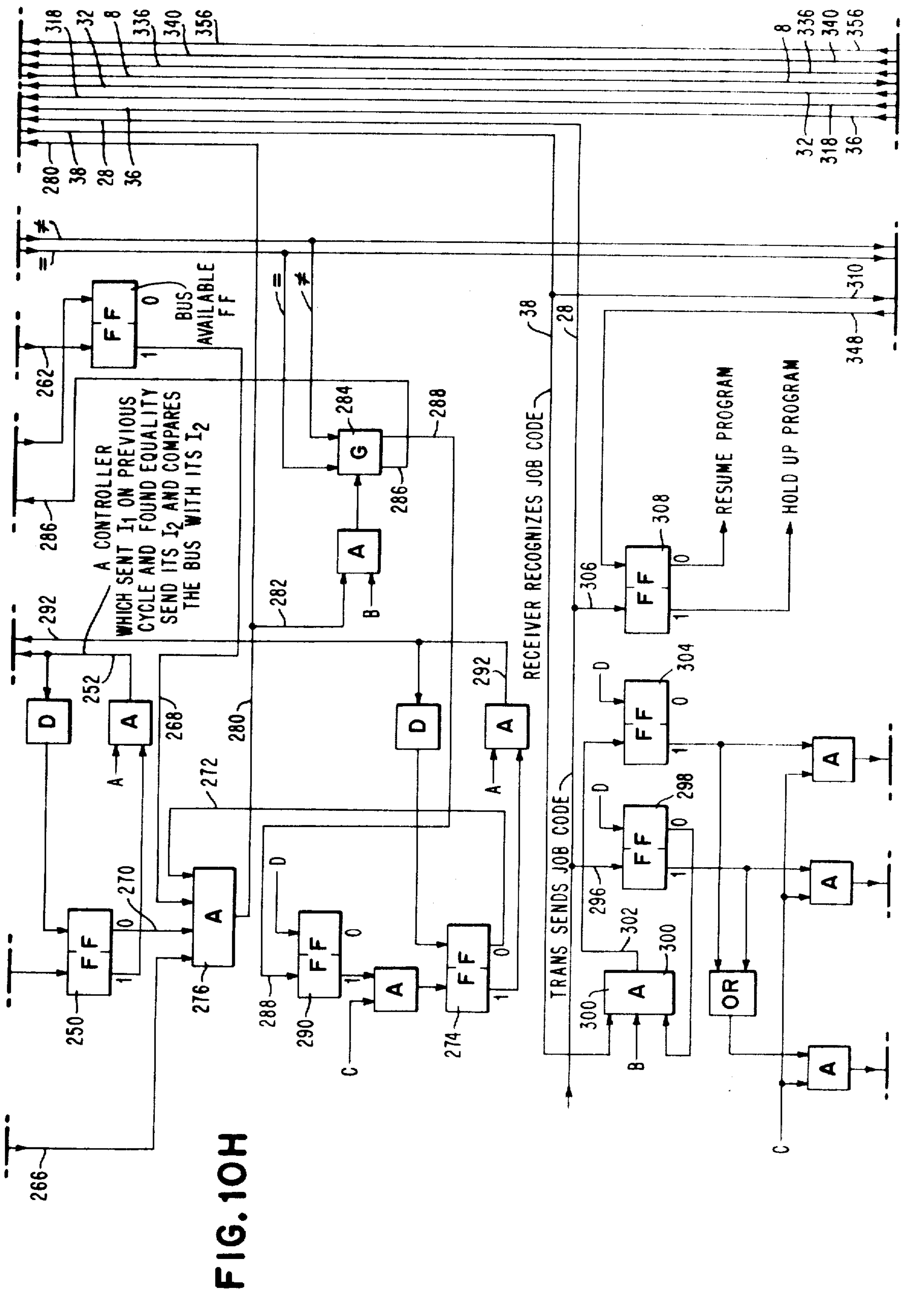

Referring to FIG. 10H, the lines 266 and 268 shown therein are active. The lines 270 and 272 also have to be active and they will so be if the flip-flops 250 and 274 are in the "0" state since the latter state is necessary in order that an AND circuit 276 be enabled. Flip-flop 274 is in the "1" state during the first tie-breaking cycle which may follow the cycle during which the seizure code is set and flip-flop 250 is in the "1" state during the second tie-breaking cycle. As "Wait" flip-flop 40 may not be reset to zero until the second tie-breaking cycle, it is necessary to disable AND circuit 276 for the two tie-breaking cycles. In other words, AND circuit 276 is enabled for the cycle during which the seizure code is sent but is disabled for the two tie-breaking cycles which may follow the seizure code sending cycle.

Thus, if AND circuit 276 is enabled at A pulse time, a line 280 is activated, the output on line 280 being effective through an OR circuit 106 to activate line 2 which gates the bus setting to the compare unit. Line 280 branches to line 11 (FIG. 10D), the output on line 11 gating the seizure code to the compare unit. Line 280 also branches to a line 30 (FIG. 10F), the output on line 30 gating the seizure code to the bus. As seen in FIG. 10H, line 280 branches to line 282, the output on line 282 being effective at B pulse time to enable a gate 284. If the compare unit finds equality, it knows that no other interaction controller is attempting to seize the bus and gate 284 produces an output on line 286 which activates line 210 through OR circuit 208. The output on line 210 resets "Wait" flip-flop 40 to "0" and instructs the interaction controller to proceed with its program as it has control of the bus.

If the compare unit finds equality, gate 284 will produce an output on line 288 to set a flip-flop 290 to the "1" state. At C pulse time, the setting of flip-flop 290 is transferred to a flip-flop 274 and at A pulse time in the next cycle, line 292 becomes active. The output on line 292 is effective through an OR circuit 232, to activate line 234 whereby the cycle hereinabove described as the E cycle (FIG. 13B) ensues and the F cycle will automatically follow for those interaction controllers that have a chance of winning the tie.

"Countoff" Sequence

Figure 10I:
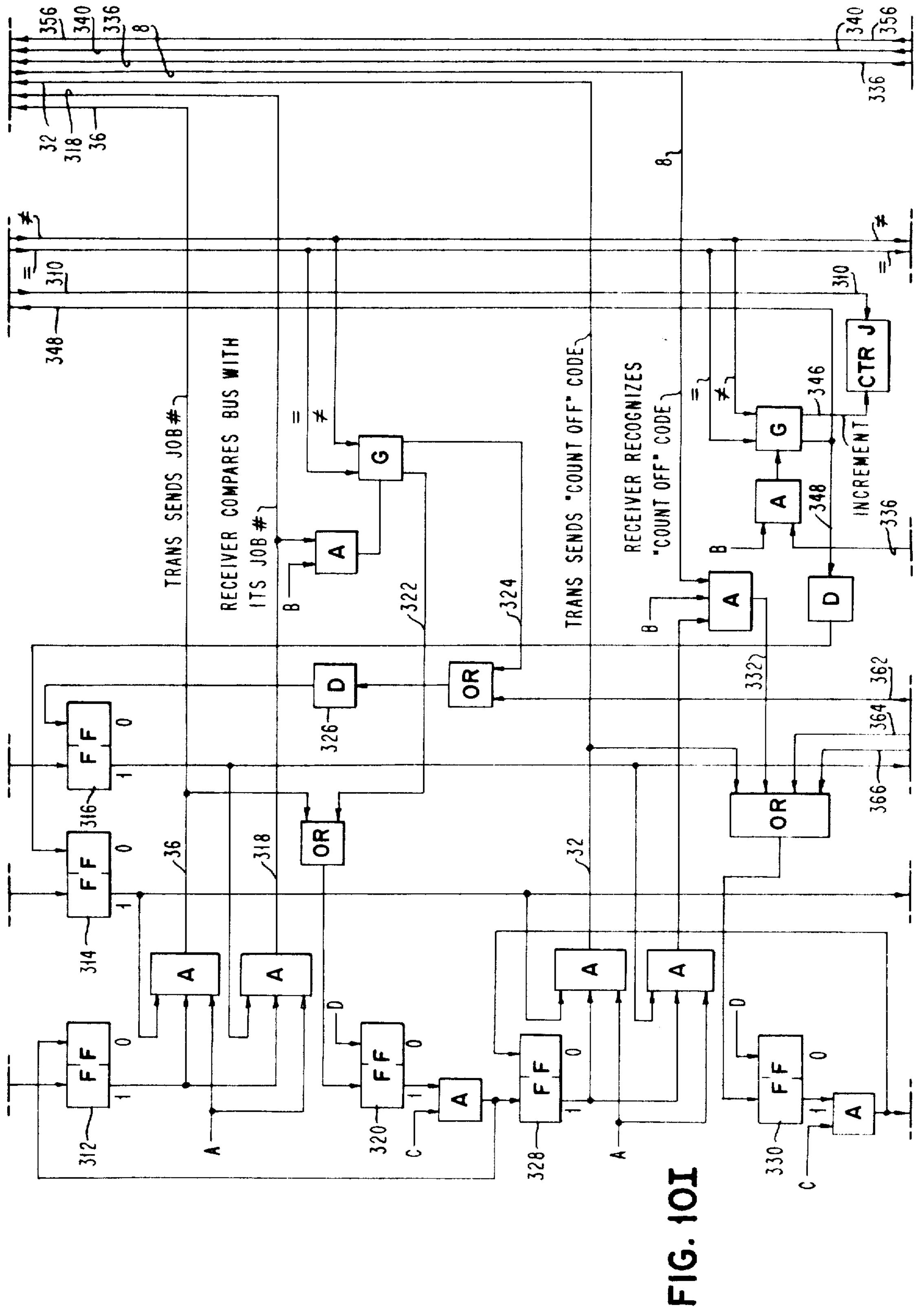

A interaction controller that has command of the bus and that wishes to initiate this sequence would activate line 28 (FIG. 10H) at A pulse time in a cycle. Such activating would occur as the result of an instruction in the program that the interaction controller is executing. Line 28 branches to a line 296, the output on line 296 setting a flip-flop 298 to the "1" state. The output on line 28 is also effective to gate the "job code" to the bus. The "job code" decoder (FIG. 10B) in all interaction controllers then produces an output on line 38. The output on line 38 is one input to an AND circuit 300 (FIG. 10H) at D pulse time producing an output on line 302 in all of the interaction controllers except the transmitting interaction controller, such output setting a flip-flop 304 to the "1" state. The AND circuit 300 in the transmitting interaction controller is disabled because flip-flop 298 therein is in the "1" state. In the transmitting interaction controller, the active state of line 28 branches to line 306 (FIG. 10H), the output on line 306 setting a flip-flop 308 to the "1" state. It is intended that flip-flop 308, when it is in its "1" state, hold up the execution of the program in the transmitting interaction controller until the "Countoff" sequence is completed since the number of cycles in the "Countoff" sequence varies depending upon the number of interaction controllers that are working on the same job. Line 28 also branches to a line 310, the output on line 310 being employed to reset counter J (FIG. 10I).

At C pulse time in the first cycle, in all interaction controllers, a flip-flop 312 is set to the "1" state. At the same time in the transmitting interaction controller, a flip-flop 314 is set to the "1" state and in all of the receiving interaction controllers a flip-flop 316 is set to the "1" state. At A pulse time in the second cycle in the transmitting interaction controller, line 36 becomes active, the output on line 36 gating the job number register (FIG. 10B) to the bus. This register may be loaded from the program by means not shown. At the same time, in the receiving interaction controllers, their respective line 318 become active, the output on a line 318 being applied as an input to OR circuit 106 (FIG. 10D). The output of OR circuit 106 appears on line 2 and is effective to gate the bus setting to the compare unit. Line 318 branches to line 34 (FIG. 10F), the output on line 318 being employed to gate the contents of the "job number" register to the compare unit.

In the transmitting interaction controller, a flip-flop 320 (FIG. 10I) is set to the "1" state when line 36 becomes active. In a receiver whose compare unit finds equality, a line 322 becomes active at B pulse time to set flip-flop 320 to the "1" state. In a receiving interaction controller that finds inequality, a line 324 becomes active and, through a delay unit 326, resets a flip-flop 316 to the "0" state. The output of delay unit 326 can occur at C pulse time in the second cycle. Thus, only the receiving interaction controllers whose job number agrees with the job number of the transmitting interaction controller perform after the first two cycles. At C pulse time in the second cycle, the setting of flip-flop 320 is transferred to a flip-flop 328.

At A pulse time in the third cycle in the transmitting interaction controller, line 32 (FIG. 10I) becomes active, the output on line 32 being effective to gate the "Countoff" code to the bus. When line 32 becomes active, it sets a flip-flop 330 in the transmitting interaction controller to the "1" state. In the receiving interaction controllers concerned in the operation, line 32 becomes active at B pulse time and, in a receiving interaction controller, the active state of line 332 is employed to set flip-flop 330 to the "1" state. At C pulse time in the third cycle, the setting of flip-flop 330 is transferred to a flip-flop 334.

Figure 10J:
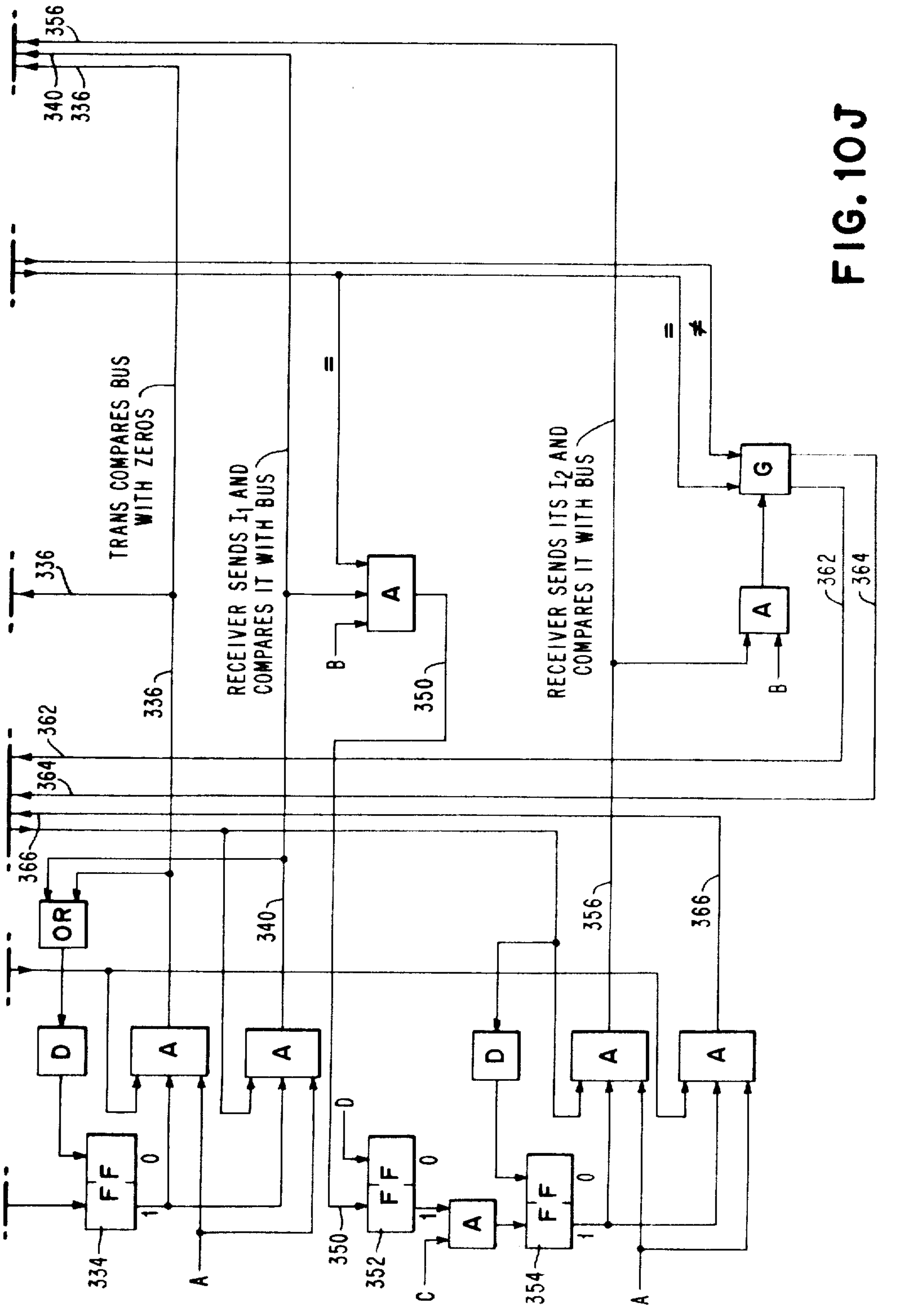

At A pulse time in the fourth cycle in the transmitting interaction controller, line 336 becomes active, the output on line 336 being applied as an input to OR circuit 106 (FIG. 10D) where it activates line 2 to gate the bus setting to the compare unit. Line 336 (FIG. 10J) branches to line 338, the output on line 338 being effective through an OR circuit 216 and line 12 to gate zeros to the compare unit. At the same time, in a receiving interaction controller, the line 340 (FIG. 10J) becomes active, the output on line 340 being applied to OR circuit 106 (FIG. 10D), the output of OR circuit 106 appearing on line 2 to gate the bus setting to the compare unit. Line 340 branches to line 342, the output on line 342 being applied as an input to OR circuit 74. The output of OR circuit 74 appears on line 16 and gates index number $I_1$ to the compare unit. Line 340 also branches to line 344, the output on line 344 being effective through OR circuit 66 and line 18 to gate the index number $I_1$ to the bus. Thus, each responding receiving interaction controller places its index number $I_1$ on the bus and compares the bus setting with its index number $I_1$.

If at B pulse time in the fourth cycle, transmitting interaction controller compare unit finds inequality, it is apprised that there is at least one responding interaction controller and line 346 becomes active to increment counter J. If the compare unit of the transmitting interaction controller finds equality, it is apprised that there is no responding interaction controller and line 348 becomes active to reset flip-flop 316 and flip-flop 308. If there are responding interaction controllers, the one or ones with the greatest index numbers $I_1$ will find equality and, at B pulse time in the fourth cycle, a line 350 becomes active to set a flip-flop 352 (FIG. 10J) to the "1" state. At C pulse time in the fourth cycle, the setting of flip-flop 352 is transferred to a flip-flop 354.

Thus, in the fifth cycle in a responding interaction controller that found equality in the fourth cycle, line 356 becomes active at A pulse time, the output on line 356 being applied as an input to OR circuit 106 and is effective through line 2 to gate the bus setting to the compare unit. Line 356 (FIG. 10J) branches to line 358, the output on line 358 being effective through an OR circuit 138 and line 22 to gate the index number $I_2$ to the compare unit. Line 356 also branches to line 360 and is effective via OR circuit 130 and line 24 to gate the index number $I_2$ to the bus. At D pulse time in the fifth cycle, the responding interaction controller with the largest index number $I_s$ will find equality. Consequently, line 362 (FIG. 10J) becomes active to reset flip-flop 316 and remove the interaction controller from the sequence as it was this interaction controller that was counted in the previous cycle. Any responding interaction controllers that find inequality have to repeat the fourth and fifth cycles, the latter repetition being effected by line 364 (FIG. 10J) which sets flip-flop 330 to the "1" state. The transmitting interaction controller does nothing in the fifth cycle. However, line 366 becomes active in order that it can repeat the fourth cycle.

The "Countoff" sequence is set forth in the following chart.

| Cycle | Transmitter | Receiver |
|---|---|---|
| 1 | Sends "Job" code | Responds to Job code. |
| 2 | Sends Job number | Compares bus with its Job number. If =, continues sequence. If ≠, drops out of sequence. |
| 3 | Sends "Count Off" code | Enters "Count Off" sequence. |
| 4 | Compares bus to zeros. If ≠, adds one to counter. If =, terminates sequence. | Sends $I_1$ and compares bus with its $I_1$. If =, sends $I_2$ on next cycle. If ≠, does nothing on next cycle and then repeats cycle 4. |
| 5 | Nothing | Sends $I_2$ and compares bus with its $I_2$. If =, drops out of sequence. If ≠, repeats cycles 4 and 5. |

The foregoing portion of the specification is essentially the same as that of the hereinabove referred to patent application, Ser. No. 653,535. There follows hereinbelow a description of FIGS. 10K—10O, and FIGS. 15—17, the latter FIGS. pertaining to the present invention.

Figure 15:
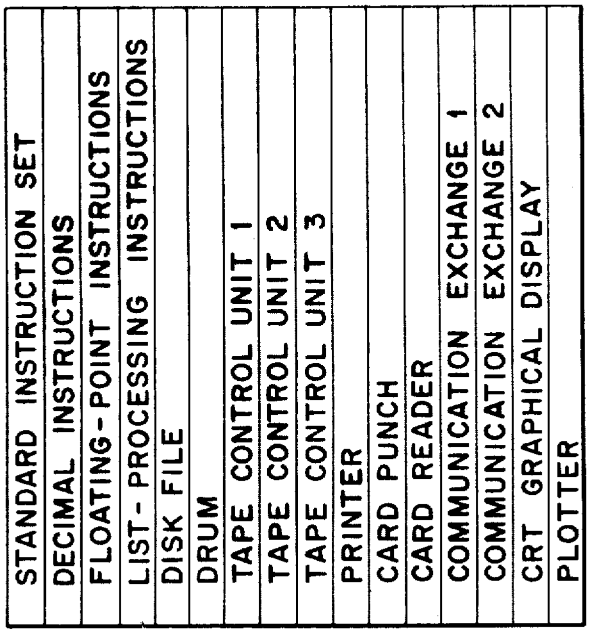
FIGS. 15A and 15B of FIG. 15 are depictions of capability or capacity vectors in accordance with the principles of the invention.
FIG. 15C of FIG. 15 is a depiction of the arrangement for assigning a weight to each capability in order to enable the determining of power indices.
FIGS. 15D and 15E of FIG. 15 are depictions of power vectors employed in accordance with the principles of the invention, each vector being shown as having a number of leading zeros equal to the power index of its unit.
Figure 15A:
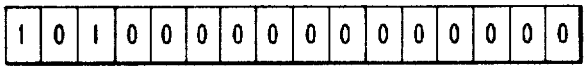
Figure 15B:

Referring now to FIG. 15, the legend headings set forth therein represent different capabilities of respective active units of a data processing system, such as a parallel or a multiprocessing system. These capabilities are depicted in registration with the bits of the capabilities or capacity vectors shown in FIGS. 15A and 15B respectively. Thus, for example, the vector depicted in FIG. 15A represents the capabilities of a processor unit $i$ in the system, such unit being capable of handling the standard instruction set and floating point instructions, the positions in the vector of FIG. 15A representing the latter capabilities being shown as "ones," such positions suitably being bits or bytes. Similarly, the vector depicted in FIG. 15B represents the capabilities for a channel unit $j$ in the system, the positions in the latter vector representing the capabilities to service a disc file and the tape control units 2 and 3 also being shown as "ones."

Thus, each active entity is associated with a capability vector. Each position of the vector is related to a discrete capability. A "one" in a given position indicates that the unit has the corresponding capability, a "zero" that it does not.

It is stipulated that a requirement vector having the same length as a capability vector (not shown) be given as part of the specification of each task. A "one" in any position in the requirement vector would indicate that the corresponding capability is needed in order to perform a given task. Thus, for an input-output task, it would be expected that only a single "one" would appear in the position associated with the input-output device which is involved in the task. For a central processor task, it could be expected that several ones would occur in the positions associated therewith.

Using the capability vectors as shown in FIGS. 15A and B and the requirement vector, an available unit can be selected to perform a given task. However, in the situation where the system comprises several such units with diverse capabilities, an additional vector, i.e., a "power" vector is needed to enable a choice from polycapable units to effect the execution of an offered task.

Figure 15C:
Figure 15D:
Figure 15E:

In the operation of such power vector, a weight (a nonnegative integer) is assigned to each capability (FIG. 15C). A power index $P_i$ is obtained for each unit $i$ by adding up the weights of the capabilities which it possesses. FIGS. 15D and 15E show examples of configurations of power vectors. The power vector is chosen to have a length equal to one more than the greatest of the power indices for the units of the system. Thus, as seen in FIGS. 15D and 15E, if it is assumed that max $P_K$=7, i.e., the greatest of the power indices is seven, then each vector has a length of eight bits.

In the configuration of the power vector for a unit $i$ (FIG. 15D), let it be assumed that its power index for $P_i$ is three. In such case, the power vector for unit $i$ comprises three "zeros" followed by five "ones" to produce a vector length of eight. Similarly, with reference to FIG. 15E, if the power index $P_j$ for unit $j$ is four, then its vector comprises four "zeros" followed by four "ones." In other words, the power vector for a given unit is $P_i$ "zeros" followed by enough "ones" to make the power vector the required length. It is to be noted as shown in the Figures that if the weights of the capabilities of units $i$ and $j$ are respectively summed, they equal three and four.

Figures 16, 17:
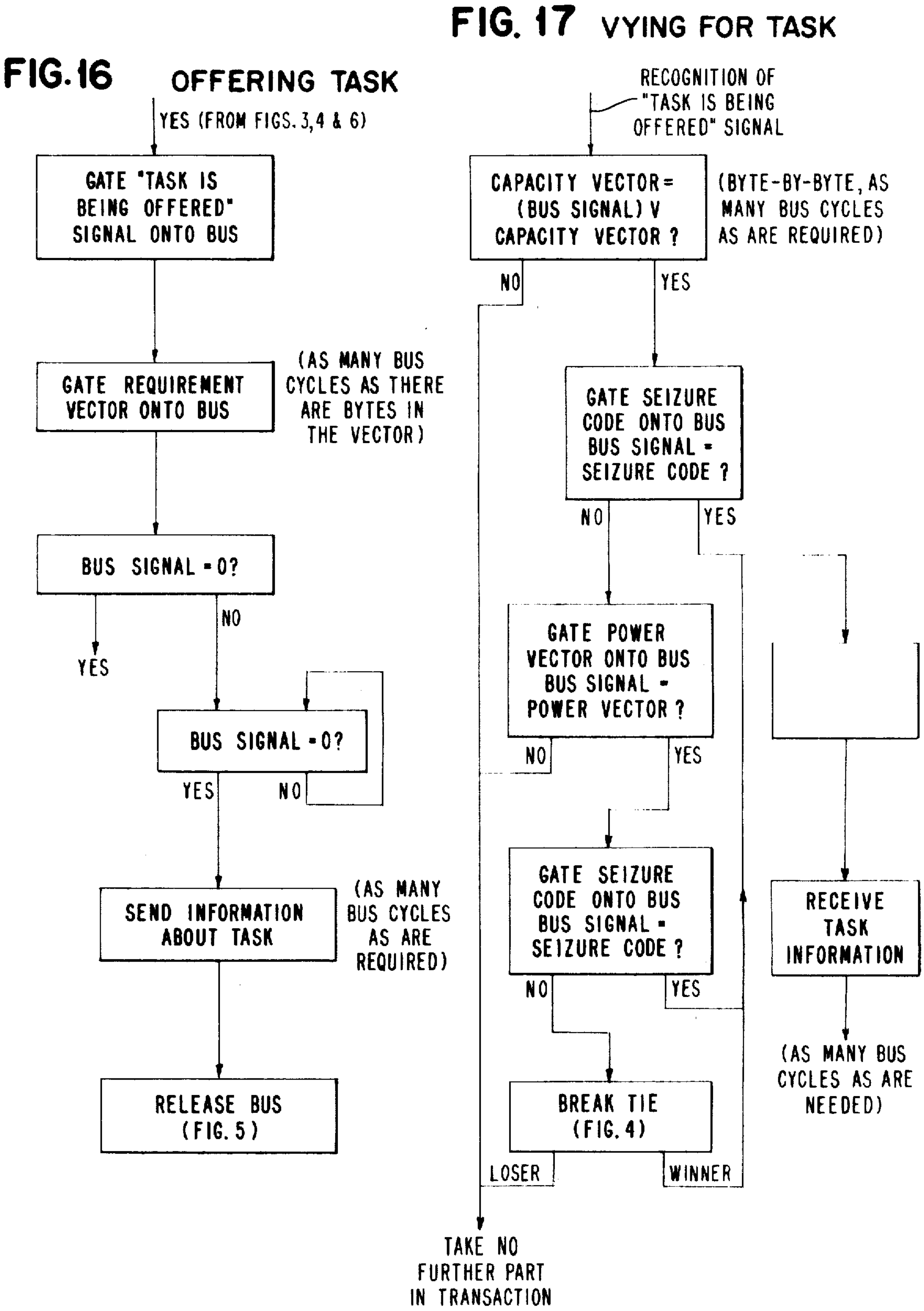
FIG. 16 is a conceptual depiction in block form of the sequence gone through by a unit in the parallel processing system which is offering a task.
FIG. 17 is a conceptual diagram of the sequence gone through by a unit which is available at the time that it recognizes that a task is being offered.

FIG. 16 shows the sequence gone through by an active entity in the data processing system which is offering a task. In this sequence, the interaction controller of the active entity which attains control of the bus (FIGS. 4 or 6) gates a "task being offered" signal onto the bus after which the requirement vector for the offered task is gated onto the bus. In the latter gating, the bus undergoes as many cycles as there are bytes in the requirement vector. If equality is found, i.e., the bus signal is "0" (as is further explained hereinbelow), this signifies that there is no entity available which can handle the tasks. If equality is not found, i.e., the bus signal is not zero, then it means that there are available entities which have the capability of executing the task which is being offered.

In the third bottommost block in FIG. 16, it is seen that once it is established that there are available entities for handling the task, there remains then the step of sending information about the task to the available units legended in the next to the bottommost block in FIG. 16. After the information has been sent, there then remains the step of releasing the bus as detailed hereinabove in connection with the explanation of FIG. 5.

The sequence depicted in FIG. 17 is illustrative of the operation for determining which of the available active entities capable of performing a given task is finally selected for performing the task. In other words, FIG. 17 shows the "vying for task" sequence, i.e., the sequence gone through by the active entities when the "task is being offered" signal is recognized.

Thus, in FIG. 17, it is to be noted that when the "task is being offered signal" is recognized, to which every nonbusy interaction controller of an activity responds, the bus is cycled to determine which available entities have the necessary capability, i.e., through their capability or capacity vectors. Those that do not have the necessary capability drop out and take no further part in this operation.

Those entities that do have the particular capability have their seizure codes gated onto the bus. In the case of the situation where the bus signal is equal only to the seizure code of a given interaction controller, i.e., there is only one capable entity, that interaction controller receives the task information, employing as many bus cycles as are required for such reception.

Where the bus signal is not equal to any of the seizure codes, i.e., there are available a plurality of active entities, the power vector is gated onto the bus. In the situations where the bus signal is equal to a power vector at this juncture, i.e., the one with the lowest power index, that interaction controller whose power vector finds such equality has its seizure code gated onto the bus. If the bus signal is equal to the latter seizure code (the bus is available), then the task information is received. As to the interaction controllers wherein no equality is found between the bus signal and the respective power vectors, no further part is taken in the transaction.

Where the bus signal is not found to be equal to a seizure code in the situation where there are available a plurality of capable entities with equal power indices, then a tie-breaking procedure is undergone as previously described hereinabove and the winner, in this case, receives the task information.

Prior to describing embodiment of the invention as depicted in FIGS. 10A—10O, it is convenient at this point of the description to note that in one illustrative embodiment, the invention operated through a given number of cycles such as eight, for example In the first of these cycles, a transmitter of an entity offering a task transmits a "new task" signal or code to which every nonbusy interaction controller of an active entity responds.

In the second of these cycles, such transmitter sends the first byte of a "requirement" code. The receivers of the other active entities compare the first bytes of their respective capabilities vectors with the disjunction between them and the bus.

In the third machine cycle, the transmitter of the active entity offering the task sends the second byte of the "requirement" code. In the receiver which has found equality in the immediately preceding cycle, i.e., where there has been a match between its capability vectors' first byte and the first byte of the requirement code, there is compared the second byte of the receiver's capability vector with the disjunction between it and the bus.

In the fourth cycle, the transmitter of the active entity offering the task seeks to detect zeros on the bus. If the code on the bus is all zeros, this transmitter signals to its active entity, an associated processor, for example, that there is no available active entity with the desired capability. If a receiver of an active entity is available wherein there had been found equality in the immediately preceding cycle, i.e., the third cycle, there is sent the first byte of the power vector of the latter receiver which is compared with the bus. If such comparison produces inequality, the receiver drops out. It is to be noted that, in this embodiment, the seizure code is not employed since the power vector consists of only two bytes. The use of the seizure code provides the advantage of speed in particular designs but is not a logical necessity.

In the fifth cycle, from any receiver wherein there had been found equality in the immediately preceding cycle, i.e., the fourth, there is sent the second byte of its power vector and such second byte is compared with the bus. If equality is not found, the receiver drops out.

In the sixth cycle, from any receiver which found equality with the bus in the immediately preceding cycle, i.e., the fifth cycle, there is sent its index number $I_1$ and such number is compared with the bus. If equality is not found as a result of this comparison, the receiver drops out.

In the seventh cycle, from any receiver in which there was found equality in the immediately preceding cycle, i.e., the sixth cycle, there is sent its index number $I_2$ which is compared with the bus. If equality is not found as a result of this comparison, the receiver drops out.

In the eighth cycle, the transmitter sends the task information. That one receiver which has met the requirements accepts such information from the transmitter.

Figure 10K:
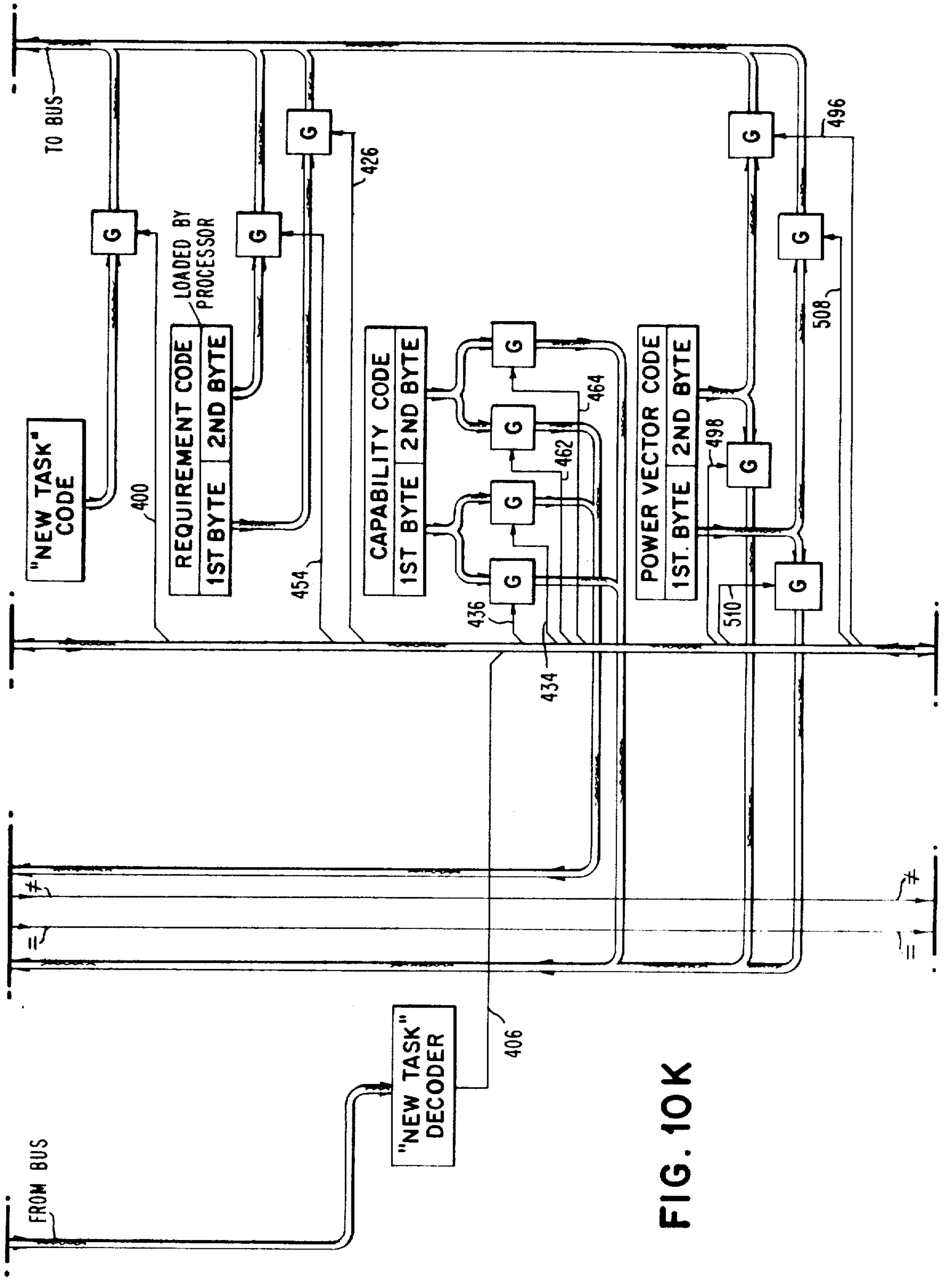
Figure 10L:
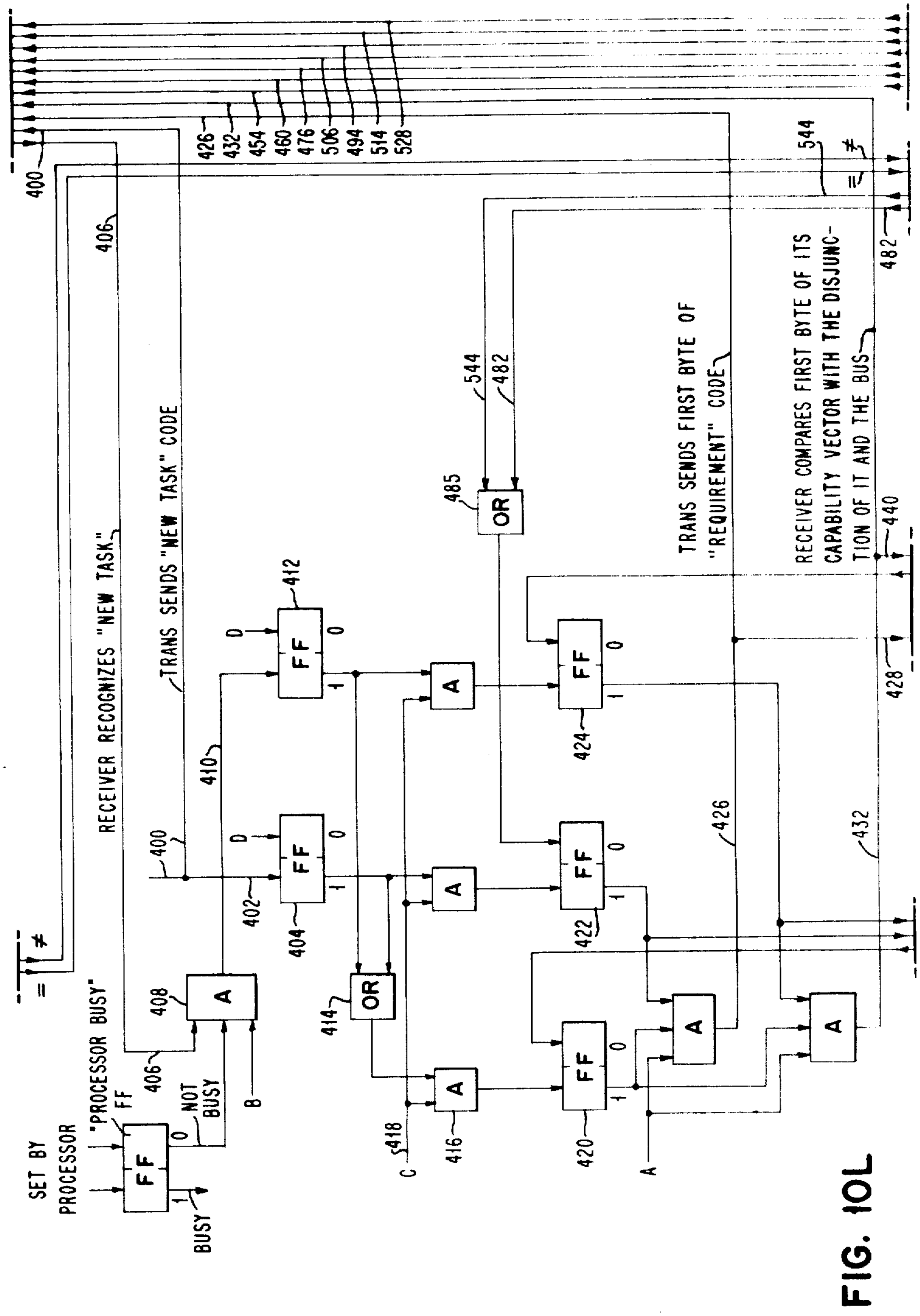

Referring now to FIGS. 10A to 10O, in a situation where an interaction controller that has command of the bus wishes to start the "new task" sequence, i.e., one which is offering a task, line 400 (FIG. 10K) is brought up at A time (FIG. 11A) in the machine cycle. Line 400 is operative to gate the "new task" code to the bus as shown in FIG. 10K. Line 400 branches to line 402, the active state of line 402 setting a flip-flop 404 (FIG. 10L) to the "1" state. The "new task" decoder in all receivers of the interaction controllers of the active entities produces an output on line 406 which is applied as one input to an AND circuit 408 (FIG. 10L). The other input to AND circuit 408 which is enabled at B time (FIG. 11B), is the reset terminal output of the "processor busy" flip-flop. With the enabling of AND gate 408, output line 410 therefrom becomes active at B time in the machine cycle in all interaction controllers whose respective associated active entities are not busy. With line 410 in the active state, a flip-flop 412 is set to its "1" state. It is to be noted at this point that flip-flop 404, when set to its "1" state, is in an interaction controller which operates as a transmitter. The flip-flop 412 is set to its "1" state in the above situation in any nonbusy receiver.

At this juncture, it is necessary to set up a timing chain which will endure for the above-mentioned eight machine cycles. In this connection, an OR circuit 414 (FIG. 10L) produces an output depending upon whether the interaction controller is a transmitter or receiver and such output is applied as one input to an AND circuit 416. The other input to AND circuit 416 arrives when the C pulse (FIG. 11C) is applied to a line 418. With this arrangement, a flip-flop 420 (FIG. 10L) is set to the "1" state at C time in the first machine cycle. In the transmitter, a flip-flop 422 is set to its "1" state at the same time, and, in a nonbusy receiver, a flip-flop 424 is also set to its "1" state at this time. Flip-flops 404 and 412 are reset to their "0" state at D time (FIG. 11D) in the first cycle.

At A time in the second machine cycle, a line 426 in the transmitter becomes active. Line 426 is operative in its active state to gate the first byte of the requirement code to the bus (FIG. 10K). Line 426, when active, is also effective through a line 428 to set a flip-flop 430 to its "1" state (FIG. 10M).

At A time in the second machine cycle, a line 432 in a nonbusy receiver becomes active to enable OR circuit 70 (FIG. 10D) to consequently activate line 4, line 4 being employed to gate the bus code to OR circuit 76 (FIG. 10A). As seen in FIG. 10F, line 432 branches to line 434, the latter line being utilized to gate the first byte of the capability code to OR circuit 76 (FIG. 10A).

Line 432 also branches to line 436 (FIG. 10F), line 436, when active, being employed to gate the first byte of the capability code to the compare unit shown in FIG. 10B. Line 432 also branches to a line 438, line 438 when active enabling OR circuit 72 to activate line 10, the active state of line 10 being utilized to gate the output of OR circuit 76 to the compare unit. With this arrangement, there is compared with the receiver in the second cycle the first byte of this capability vector with the disjunction between it and the bus, i.e., the requirement vector.

Figure 10M:
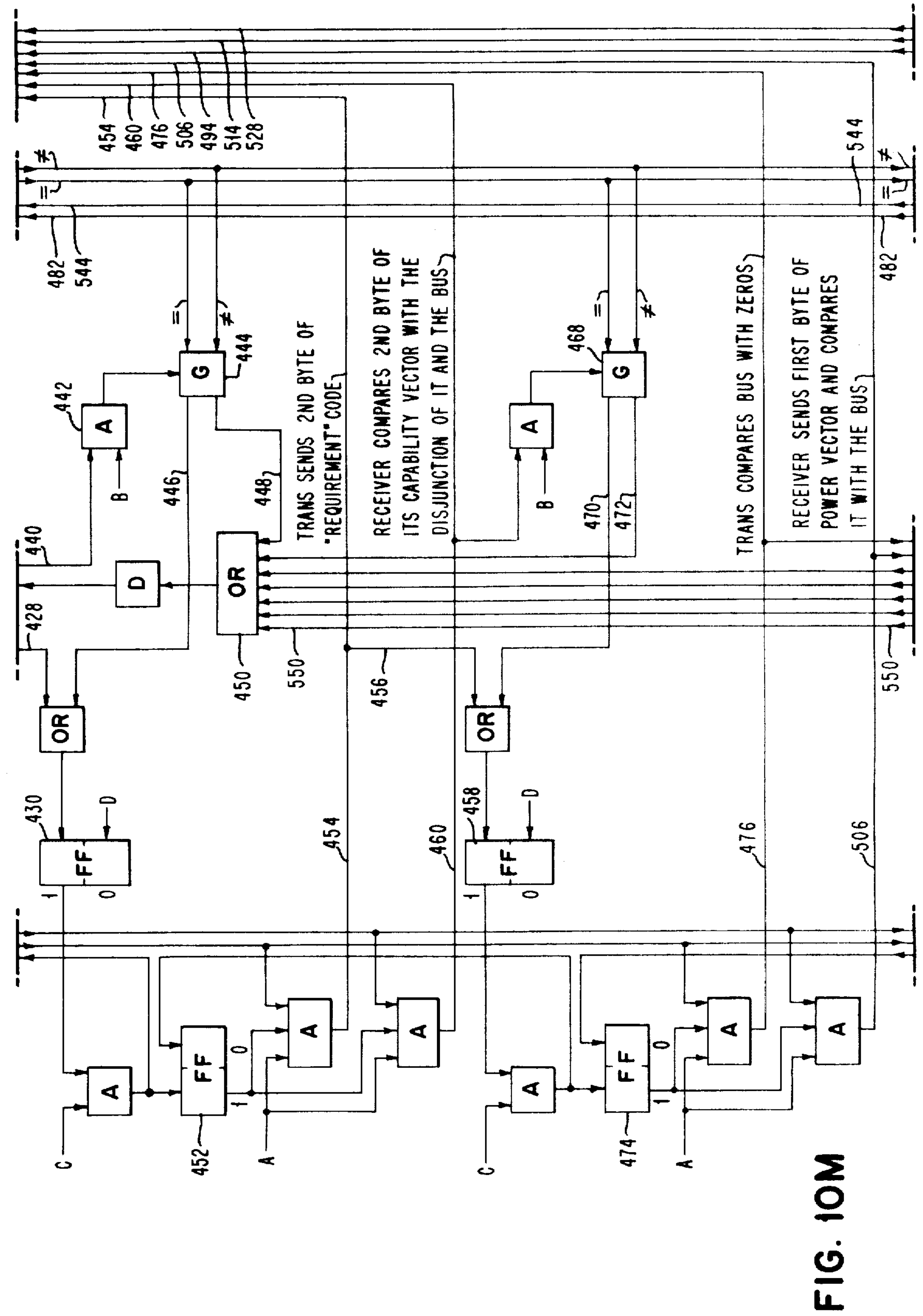

Line 432 when active is utilized via a line 440 to enable an AND circuit 442 (FIG. 10M). At B time in the second machine cycle, AND circuit 442 produces an output which is applied to a gate 444. If the output of the compare circuit is on the "equal" line, then gate 444 produces an output on a line 446. Such output indicates to a receiver of the interaction controller of an active entity that it may have the capability of doing the particular task in question. Line 446 when in its active state is thus effective to set flip-flop 430 to its "1" state. If the output of the compare circuit shows inequality, then gate 444 produces an output on a line 448, such output enabling an OR circuit 450. The output of OR circuit 450 is passed through a delay circuit and is then employed to reset flip-flop 424 to its "0" state. When flip-flop 424 is reset to its "0" state, such event is an indication that the active entity associated with the receiver does not have the capability of doing the task and, therefore, it is removed from the contest. At C time in the second machine cycle, the "1" state of flip-flop 430 is transferred to a flip-flop 452 (FIG. 10M). Concurrently, flip-flop 420 is reset to its "0" state. At D time in the second machine cycle, flip-flop 430 is reset to its "0" state.

At A time in the third machine cycle, a line 454 in the transmitter is activated, such active line being employed to gate the second byte of the requirement code to the bus (FIG. 10K). Line 454 also branches to line 456 (FIG. 10M), active line 456 setting a flip-flop 458 to its "1" state.

In a receiver at A time in the third machine cycle, a line 460 is activated to enable OR circuit 70 (FIG. 10D) in order to activate line 4. At this juncture, line 4 is utilized to gate the bus to OR circuit 76. As shown in FIG. 10, a branch circuit from a line 462 extends from a line 460. Line 462 is employed to gate the second byte of the capability code to OR circuit 76. A line 464 branches from line 460 and is used to gate the second byte of the capability code to the compare unit (FIG. 10B). A line 466 branches from line 460 and is applied to OR circuit 72 to activate line 10, line 10 being employed to gate OR circuit 76 to the compare unit. With this arrangement, in any receiver that found equality during the second machine cycle, there is compared the second byte of its capability vector with the disjunction of it and the bus. In a receiver, at B time in the third machine cycle, a gate 468 (FIG. 10M) will be operative to sample the output of the compare unit. If the output of the compare unit is "equal," a line 470 is activated to set flip-flop 458 (FIG. 10M) to its "1" state. If the output of the compare unit is unequal, a line 472 is activated to cause the receiver to drop out.

At C time in the third machine cycle, the "1" state of a flip-flop 458 is transferred to flip-flop 474. Concurrently, flip-flop 452 is reset to its "0" state. At D time in the third machine cycle, flip-flop 458 is reset to its "0" state.

Figure 10N:
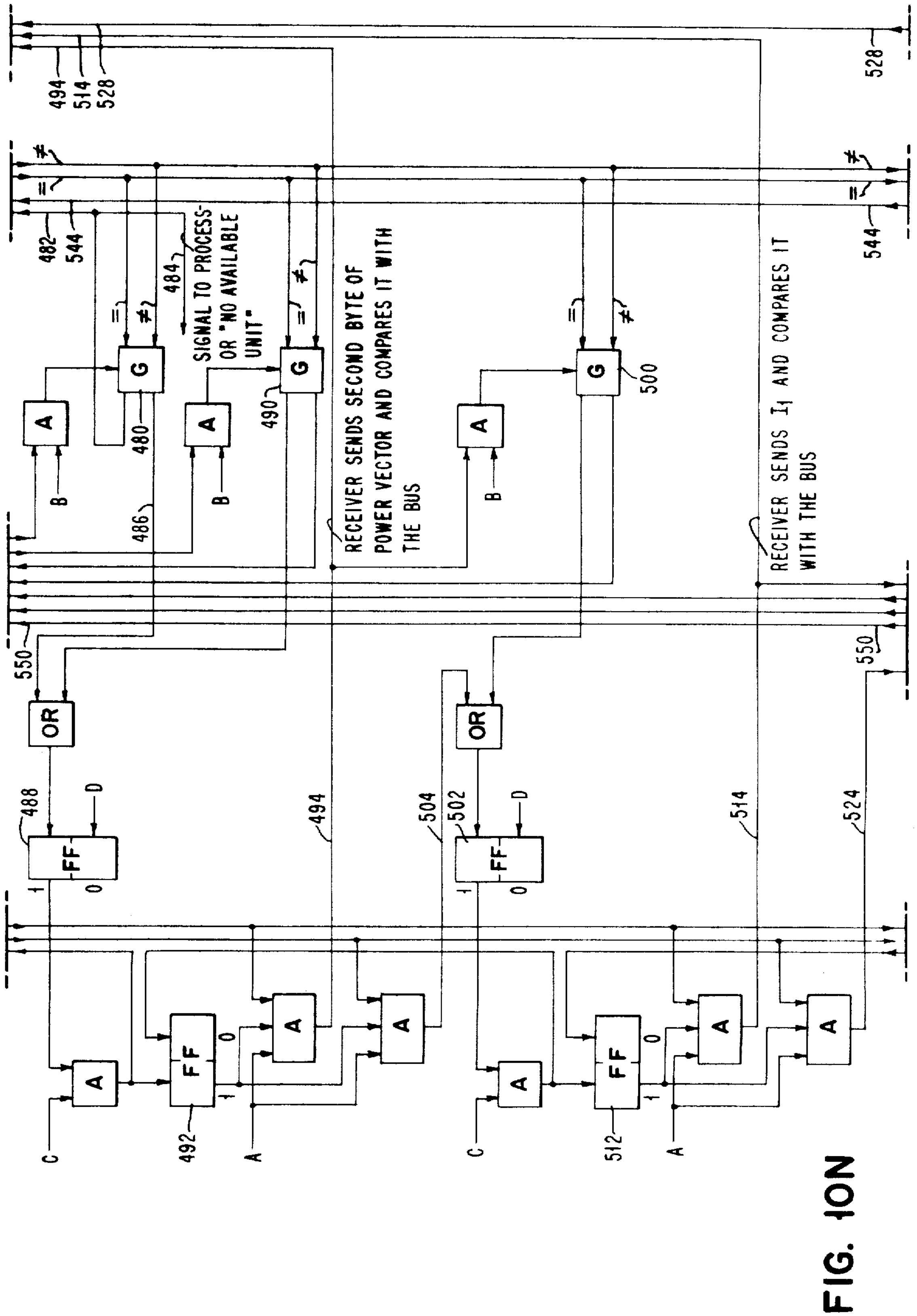
Figure 10G:
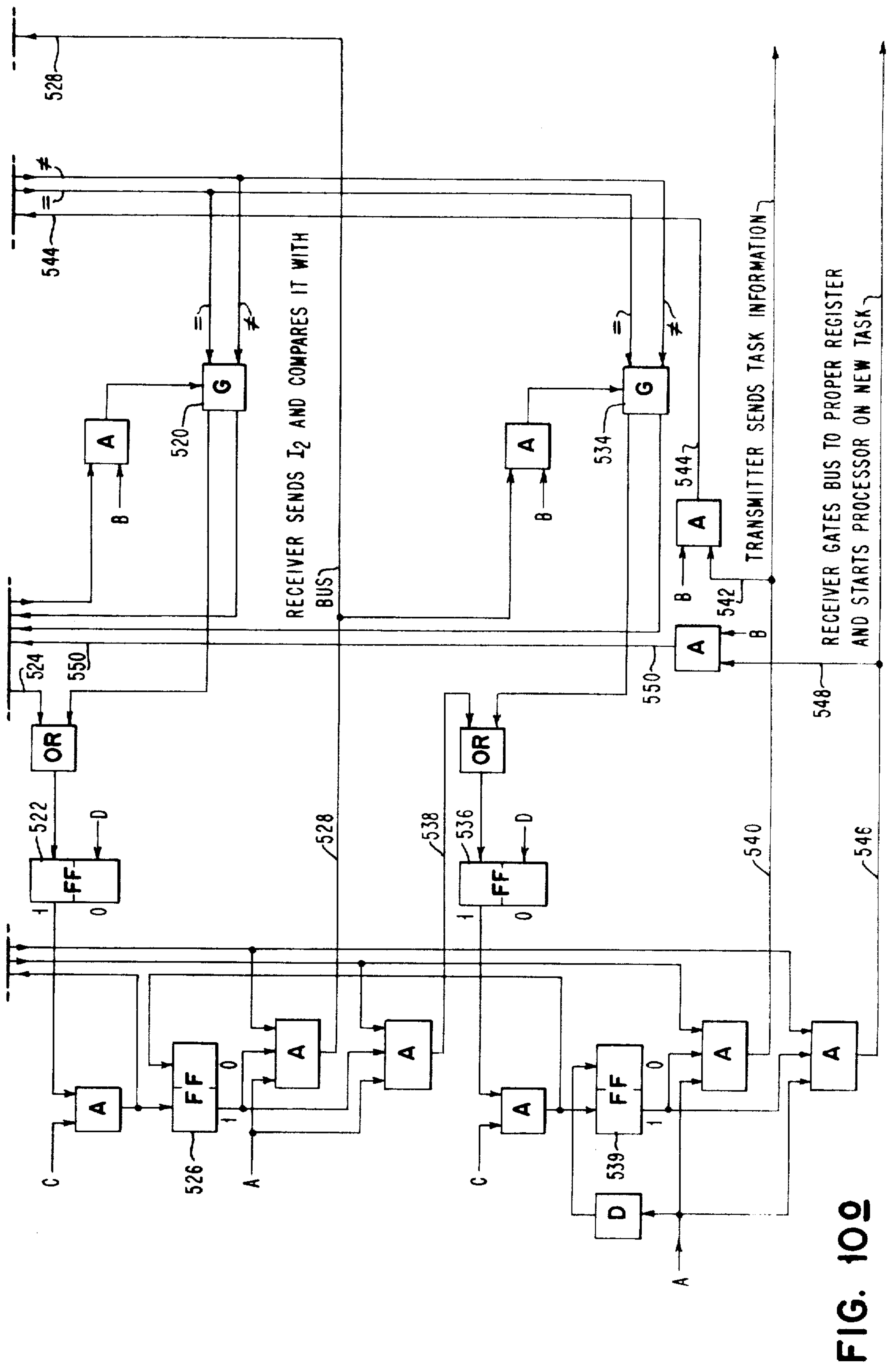

At A time in the fourth machine cycle, a line 476 is activated to enable OR circuit 106 (FIG. 10D) and thereby activate line 2. The active state of line 2 is employed to gate the bus to the compare unit. As shown in FIG. 10D, a line 478 branches from line 476, the active state of line 478 being employed to enable OR circuit 216 to thereby activate line 12, the active state of line 12 being utilized to gate zeros to the compare unit. In this manner, during the fourth machine cycle, there is compared in the transmitter the bus setting with the aforesaid zeros. Such comparison is done in order to ascertain whether there is any receiver which is capable of performing the task in question. At B time in the fourth machine cycle, a gate 480 (FIG. 10N) is employed by the transmitter to sample the contents of the compare unit. If the output of the compare unit is equal, a line 482 becomes active to cause a signal to be sent to the associated active entity, such as a processor, on a line 484, such signal advising the processor that there is no available unit to perform the task at hand. The active state of line 482 is employed to enable an OR circuit 485, the output of the latter circuit being employed to reset flip-flop 422 to its "0" state. Such resetting of flip-flop 422 signifies that the operation is completed and the sequence would thereby end in the fourth machine cycle. However, if the compare unit at this juncture produces an unequal output, it signifies that there is an available unit and, consequently, a line 486 is activated to set a flip-flop 488 to its "1" state (FIG. 10N).

In this manner, the timing chain is kept going if there is an available unit to perform the task. In a receiver during the fourth machine cycle, the compare unit is sampled by a gate 490 (FIG. 10N). An equal condition at this time results in the setting of flip-flop 488 to its "1" state. An unequal condition results in the producing of an output from OR circuit 450, such output causing the receiver to drop out. At C time in the fourth cycle, the "1" setting of flip-flop 488 is transferred to a flip-flop 492 (FIG. 10N).

At A time in the fourth cycle, a line 506 is activated in a receiver, line 506 enabling OR circuit 106 in order to activate line 2 (FIG. 10D). Line 2, when active, is operative to gate the bus to the compare unit. As shown in FIG. 10F, a line 508 branches from line 506 and is employed to gate the first byte of the power vector to the bus. A line 510 branches from line 506 and is used to gate the first byte of the power vector to the compare unit.

At A time in the fifth cycle, line 494 in a receiver is activated and, at this juncture, is operative to enable OR circuit 106 in order to activate line 2, the active line 2 gating the bus to the compare unit. The active state of line 496 which branches from 494 is employed to gate the second byte of the power vector to the bus. A line 498 which extends from line 494 (FIG. 10F) is utilized to gate the second byte of the power vector to the compare unit. At B time in the fifth cycle, the compare unit is sampled by a gate 500 (FIG. 10N). An equal condition from the compare unit results in the setting of a flip-flop 502 to its "1" state. An unequal condition results in the enabling of OR circuit 450 to cause the receiver to drop out.

In the transmitter at A time in the fifth cycle, a pulse appears on line 504 and is employed to set flip-flop 502 to its "1" state. At C time in the fifth cycle, the "1" setting of flip-flop 502 is transferred to flip-flop 512.

The next two cycles are utilized to resolve any ties which might exist between two or more receivers as already explained hereinabove. This possible tie is resolved in favor of the receiver having the highest index number.

At A time in the sixth cycle, a line 514 in a receiver is activated, the active state of line 514 enabling OR circuit 106 to consequently activate line 2, line 2 being operative to gate the bus to the compare unit. A line 516 extends from line 514 (FIG. 10F), line 516 enabling OR circuit 66 to consequently activate line 18, line 18 being employed to gate the index number $I_1$ to the bus. A line 518 also branches from line 514, line 518 being operative in its active state to enable OR circuit 74 to consequently activate line 16, line 16 being employed to gate the index number $I_1$ to the compare unit. At B time in the sixth cycle, the compare unit is sampled by a gate 520 (FIG. 10O). An equal condition at this time results in the setting of flip-flop 522 to its "1" state. An unequal condition causes the receiver to drop out. In the transmitter, flip-flop 522 is set to its "1" state by the pulse present on line 524. At C time in the sixth cycle, the "1" setting of flip-flop 522 is transferred to flip-flop 526.

At A time in the seventh cycle, a line 528 is activated to enable OR circuit 106 (FIG. 10D) in order to activate line 2, whereby line 2 thereby gates the bus to the compare unit. A branch line 530 extends from line 528, the active state of line 530 being employed to enable OR circuit 130 to thereby activate line 24 which is operative to gate the index number $I_2$ to the bus. As shown in FIG. 10F, a branch line 532 extends from line 528, line 532 when active enabling OR circuit 138 in order to activate line 22, line 22 in its active state being used to gate the index number $I_2$ to the compare unit.

At B time in the seventh cycle, the compare unit is sampled by a gate 534 (FIG. 10O). An equal condition output from the compare unit results in the setting of a flip-flop 536 to its "1" state. An unequal condition results in the receivers dropping out. In the transmitter, flip-flop 536 is set to its "1" state by a pulse on a line 538. At C time in the seventh cycle, the "1" setting of flip-flop 536 is transferred to a flip-flop 539 to effect the eighth cycle.

During the eighth cycle, the transmitter sends the task information and the receiver gates the bus to the proper register and initiates the processor in its new task. In this eighth cycle, at A time, the pulse on a line 540 branches to a line 542. At B time in the eighth cycle, a line 544 (FIG. 10N) is activated to reset flip-flop 422 to its "0" state. In the receiver, the pulse on line 546 branches to a line 548 and at B time the pulse on line 550 (FIG. 10O) is used to reset flip-flop 424 to its "0" state.

While the invention has been particularly shown and described with reference to preferred embodiments thereof, it will be understood by those skilled in the art that the foregoing and other changes in form and details may be made therein without departing from the spirit and scope of the invention.

What we claim is:

1. A control system for a data processing system which includes a plurality of active components of diverse overlapping capabilities comprising:

means for providing each of said active components with a capability factor wherein there are listed the discrete capabilities of said components, said capability factors being defined by binary words;

means for providing each task offered to said system with a requirement factor wherein there are listed discrete capabilities, said requirement factors being defined by binary words;

said capability factor and requirement factor words respectively comprising equal numbers of bit positions, corresponding bit positions in said factor words representing corresponding requirements and capabilities, a binary one in a bit position in a capability factor word representing a particular capability, a binary one in a bit position is a requirement factor word representing a required capability; and means responsive to the offering to said system of a task for effecting the execution of said task, said active components which have the respective required capabilities being specified for said task by said requirement factor.

2. A control system as defined in claim 1 wherein said selecting means includes:

means for providing a power factor to each active component, each of said power factors having a number of bit positions at least equal to the maximum number of discrete capabilities of any of said components in said system;

means for summing the discrete capabilities of each of said components, the respective sums of the capabilities of each of said components being their power indices, and means responsive to the presence of a plurality of available ones of said components having the capability required for an offered task, for selecting for the execution of said task that one of said last-named components which has the lowest power index.

3. In an interaction control system for data processing system which includes a plurality of active components and which comprises an interaction control unit associated with each active component and common bus means connected to each of the control units for enabling direct communication between said control units, each of said control units comprising means responsive to commands from its associated active component for executing instruction sequences specified by such active component, means responsive to commands from others of said control units for executing instruction sequences specified by said other control units, means for respectively providing each control unit with a unique command bus seizure code, means for applying said seizure code to said bus and for ascertaining the seizure code present on said bus, means for comparing said unique seizure code with said code on said bus, a chosen result from such comparison representing the available state of said bus, and tie-breaking means responsive to simultaneous attempts of a plurality of control units to take control of said bus for selecting one of said last-named control units for command of said bus, the improvement which comprises:

means for providing each of said active components with a capability factor, said capability factor being defined by a binary word having a chosen number of bit positions, a binary one in a bit position in a capability factor word representing a discrete capability;

means for providing each task offered to said system for execution with a requirement factor, said requirement factor being defined by a binary word having said number of bit positions, a binary one in a bit position in a requirement factor word representing a required capability, corresponding bit positions in said capability and requirement factor words representing the same respective capabilities and requirements;

means for providing a power factor to each active component, each of said power factors having a number of bit positions at least equal to the maximum number of bit positions defining the discrete capabilities of any of said components;

means for summing the discrete capabilities of said components, the respective sums of the discrete capabilities of each of said components being their power indices; and means responsive to the presence of a plurality of available ones of said components having the capability required for an offered task for selecting for execution of said task that one of said last-named components which has the lowest power index.

4. In an interaction control system for a data processing system which includes a plurality of active components and which comprises an interaction control unit associated with each active component and common bus means connected to each of the control units for enabling direct communication between said control units, each of said control units comprising means responsive to commands from its associated active component for executing instruction sequences specified by such active component, means responsive to commands from others of said control units for executing instruction sequences specified by said other control units, means for respectively providing each control unit with a unique common bus seizure code, means for applying said seizure code to said bus and for ascertaining the seizure code present on said bus, means for comparing said unique seizure code with said code on said bus, a chosen result from such comparison representing the available state of said bus, and tie-breaking means responsive to simultaneous attempts of a plurality of control units to take control of said bus for selecting one of said last-named control units for command of said bus, the improvement which comprises:

means for providing each of said active components with a capability factor, said capability factor being defined by a binary word having a chosen number of bit positions, a binary one in a bit position in a capability factor word representing a discrete capability;

means for providing each task offered to said system for execution with a requirement factor, said requirement factor being defined by a binary word having said chosen number of bit positions, a binary one in a bit position in a requirement factor word representing a required capability, corresponding bit positions in said capability and requirement factor words representing the same respective capabilities and requirements;

means for providing a power factor to each active component, each of said power factors having a number of bit positions at least equal to the maximum number of bit positions defining the discrete capabilities of any of said components;

means for summing discrete the capabilities of said components, the respective sums of the discrete capabilities of each of said components being their power indices;

means responsive to the presence of a plurality of available ones of said components having the capability required for an offered task for selecting for execution of said task that one of said last-named components which has the lowest power index;

means for enabling one of said active components to offer a task to the other active components of said system by generating a task offering signal;

means for enabling said task offering component to take command of said bus and to gate said offering signal to said commanded bus;

means responsive to the gating of said offering signal onto said bus for gating the requirement factor of said offered task onto said bus; and means for comparing said last-named requirement factor with said capability factor for ascertaining the availability among the others of said active components of components capable of executing said offered task.

5. In an interaction control system as defined in claim 4 wherein there is further included means for enabling an active component having a capability factor which finds equality in comparison with a requirement factor by the action of said comparing means to seize command of said bus to receive said task information.